US012367468B2

(12) United States Patent
Wright et al.

(10) Patent No.: US 12,367,468 B2
(45) Date of Patent: Jul. 22, 2025

(54) BLOCKCHAIN-IMPLEMENTED METHOD FOR CONTROL AND DISTRIBUTION OF DIGITAL CONTENT

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 17/882,433

(22) Filed: Aug. 5, 2022

(65) Prior Publication Data
US 2023/0070963 A1    Mar. 9, 2023

Related U.S. Application Data

(63) Continuation of application No. 16/079,091, filed as application No. PCT/IB2017/050978 on Feb. 21, 2017, now Pat. No. 11,410,145.

(30) Foreign Application Priority Data

Feb. 23, 2016   (GB) ....................................... 1603117
Apr. 29, 2016   (GB) ....................................... 1607484
Nov. 15, 2016   (GB) ....................................... 1619301

(51) Int. Cl.
*G06Q 20/12*    (2012.01)
*G06Q 20/06*    (2012.01)
(Continued)

(52) U.S. Cl.
CPC ..... *G06Q 20/1235* (2013.01); *G06Q 20/0658* (2013.01); *G06Q 20/3829* (2013.01);
(Continued)

(58) Field of Classification Search
None
See application file for complete search history.

(56) References Cited

U.S. PATENT DOCUMENTS 5,535,276 A    7/1996  Ganesan
5,600,725 A    2/1997  Rueppel et al.
(Continued)

FOREIGN PATENT DOCUMENTS

AU    2016100059 A4    3/2016
CA    2867765 A1       4/2016
(Continued)

OTHER PUBLICATIONS

Wuille Pieter: "Hierarchical Deterministic Wallets", version date Feb. 5, 2016, Retrieved from the Internet: https://github.com/bitcoin/bips/blob/master/bip-0032.mediawiki (Year: 2016).*
(Continued)

*Primary Examiner* — Steven S Kim
*Assistant Examiner* — Jason B Fenstermacher
(74) *Attorney, Agent, or Firm* — Tarolli, Sundheim, Covell & Tummino LLP

(57) ABSTRACT

The disclosure relates to a blockchain-implemented system and method of controlling the transmission and/or distribution of digital content. A first user transfers a deposit quantity of cryptocurrency to a common address. A first node associated with the first user: sends a request to the second node to provide an episode of digital content from a series of digital content; determines a payment transaction to transfer a payment quantity of cryptocurrency to the second user based on a quantity of episodes of digital content in the series; and signs and sends the payment transaction to a second node. The second node associated with the second user: receives the request and the payment transaction; verifies the payment transaction; and based on a result of verifying: provides access to the episode of digital content to the first node; and co-signs and sends the payment transaction to a distributed ledger.

10 Claims, 6 Drawing Sheets

(51) Int. Cl.
  *G06Q 20/38*    (2012.01)
  *H04L 9/06*     (2006.01)
  *H04L 9/14*     (2006.01)
  *H04L 9/30*     (2006.01)
  *H04L 9/00*     (2022.01)

(52) U.S. Cl.
  CPC ......... *G06Q 20/389* (2013.01); *H04L 9/0643* (2013.01); *H04L 9/14* (2013.01); *H04L 9/3073* (2013.01); *G06Q 2220/00* (2013.01); *H04L 9/50* (2022.05); *H04L 2209/56* (2013.01); *H04L 2209/603* (2013.01)

(56) References Cited

U.S. PATENT DOCUMENTS

| | | |
|---|---|---|
| 5,761,305 A | 6/1998 | Vanstone et al. |
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,487,660 B1 | 11/2002 | Vanstone et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 7,970,135 B1 | 6/2011 | Schwenk |
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 | 5/2018 | Murphy et al. |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 11,188,907 B1 | 11/2021 | Vijayvergia et al. |
| 11,210,663 B2 | 12/2021 | Voorhees |
| 11,372,455 B2 | 6/2022 | Gauthier, Jr. |
| 11,455,378 B2 | 9/2022 | Wright et al. |
| 11,663,609 B2 | 5/2023 | Christidis et al. |
| 11,727,501 B2 | 8/2023 | Wright |
| 2001/0002486 A1 | 5/2001 | Kocher et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Hikosaka et al. |
| 2004/0193890 A1 | 9/2004 | Girault |
| 2004/0252831 A1 | 12/2004 | Jehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153366 A1 | 7/2006 | Beeson |
| 2006/0153367 A1 | 7/2006 | Beeson |
| 2006/0153368 A1 | 7/2006 | Beeson |
| 2006/0153370 A1 | 7/2006 | Beeson |
| 2006/0156012 A1 | 7/2006 | Beeson |
| 2006/0156013 A1 | 7/2006 | Beeson |
| 2006/0161485 A1 | 7/2006 | Meldahl |
| 2006/0173788 A1* | 8/2006 | Nath Pandya .......... G06F 21/10 705/59 |
| 2006/0179319 A1 | 8/2006 | Krawczyk |
| 2006/0242038 A1 | 10/2006 | Giudilli |
| 2006/0248114 A1* | 11/2006 | Anderson ............... G06Q 30/06 |
| 2007/0055880 A1 | 3/2007 | Lauter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0165955 A1 | 7/2008 | Ibrahim |
| 2008/0195499 A1 | 8/2008 | Meredith et al. |
| 2008/0260143 A1 | 10/2008 | Ibrahim |
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1 | 11/2009 | Rose et al. |
| 2010/0005302 A1 | 1/2010 | Vishnu et al. |
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |
| 2011/0208970 A1 | 8/2011 | Brown et al. |

(56) References Cited

U.S. PATENT DOCUMENTS

| | | |
|---|---|---|
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0090026 A1 | 4/2012 | Andrews et al. |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0046792 A1 | 2/2014 | Ganesan |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0132620 A1 | 5/2014 | Kim |
| 2014/0188719 A1 | 7/2014 | Poornachandran et al. |
| 2014/0195425 A1 | 7/2014 | Campos et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0124961 A1 | 5/2015 | Lambert et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0215336 A1 | 7/2015 | Navaraj et al. |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0371224 A1 | 12/2015 | Lingappa |
| 2015/0379510 A1 | 12/2015 | Smith |
| 2015/0381729 A1 | 12/2015 | Manohar et al. |
| 2016/0012465 A1 | 1/2016 | Sharp |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | McConaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1* | 11/2016 | Lam .................. G06Q 20/0658 |
| 2016/0342984 A1 | 11/2016 | Thomas et al. |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1 | 2/2017 | Haldenby et al. |
| 2017/0046698 A1 | 2/2017 | Haldenby et al. |
| 2017/0046792 A1 | 2/2017 | Haldenby et al. |
| 2017/0046806 A1 | 2/2017 | Haldenby et al. |
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |

(56) References Cited

U.S. PATENT DOCUMENTS

| | | |
|---|---|---|
| 2017/0103385 A1 | 4/2017 | Wilson, Jr. et al. |
| 2017/0109540 A1 | 4/2017 | Heiman et al. |
| 2017/0116608 A1 | 4/2017 | Forzley et al. |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1* | 6/2017 | Voorhees .......... H04L 9/3255 |
| 2017/0154391 A1 | 6/2017 | Watkins et al. |
| 2017/0169403 A1 | 6/2017 | Zhang |
| 2017/0178237 A1 | 6/2017 | Wong |
| 2017/0178263 A1* | 6/2017 | Kraemer .......... G06Q 20/1235 |
| 2017/0185527 A1 | 6/2017 | Ueda |
| 2017/0187535 A1* | 6/2017 | Middleton .......... G06Q 20/02 |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0243214 A1 | 8/2017 | Johnsrud et al. |
| 2017/0250801 A1 | 8/2017 | Chen et al. |
| 2017/0300877 A1 | 10/2017 | Mann et al. |
| 2017/0308580 A1 | 10/2017 | Naganuma et al. |
| 2017/0316390 A1 | 11/2017 | Smith et al. |
| 2017/0324663 A1 | 11/2017 | Menase |
| 2017/0324715 A1 | 11/2017 | Frincu et al. |
| 2018/0025670 A1 | 1/2018 | Ikarashi et al. |
| 2018/0034810 A1 | 2/2018 | Pe'er et al. |
| 2018/0096360 A1 | 4/2018 | Christidis et al. |
| 2018/0109377 A1 | 4/2018 | Fu |
| 2018/0123780 A1 | 5/2018 | Ikarashi |
| 2018/0131512 A1 | 5/2018 | Gajek |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0276663 A1 | 9/2018 | Arora |
| 2018/0285840 A1 | 10/2018 | Hasan |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0244186 A1 | 8/2019 | Guo et al. |
| 2019/0266132 A1 | 8/2019 | Rubenstein |
| 2019/0305863 A1* | 10/2019 | Fayyad .......... H04H 60/372 |
| 2019/0340352 A1 | 11/2019 | Peeters et al. |
| 2019/0349733 A1 | 11/2019 | Nolan et al. |
| 2019/0378139 A1 | 12/2019 | Stribady et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1 | 8/2020 | Padmanabhan |
| 2020/0264676 A1 | 8/2020 | Gauthier, Jr. |
| 2020/0285935 A1 | 9/2020 | Song et al. |
| 2021/0056070 A1 | 2/2021 | Kakavand et al. |
| 2021/0194677 A1 | 6/2021 | Pourzandi et al. |
| 2021/0304198 A1 | 9/2021 | Lingappa |
| 2021/0409489 A1 | 12/2021 | Speasl et al. |

FOREIGN PATENT DOCUMENTS

| | | |
|---|---|---|
| CN | 1262007 A | 8/2000 |
| CN | 101447980 A | 6/2009 |
| CN | 101477669 A | 7/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104392354 A | 3/2015 |
| CN | 104463001 A | 3/2015 |
| CN | 104620535 A | 5/2015 |
| CN | 104704504 A | 6/2015 |
| CN | 105204802 A | 12/2015 |
| CN | 105306194 A | 2/2016 |
| CN | 105323064 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001069566 A | 3/2001 |
| JP | 2001195479 A | 7/2001 |
| JP | 2002026895 A | 1/2002 |
| JP | 2004192587 A | 7/2004 |
| JP | 2004246882 A | 9/2004 |
| JP | 2004341152 A | 12/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2014068140 A | 4/2014 |
| JP | 2014153583 A | 8/2014 |
| JP | 2015536617 A | 12/2015 |
| JP | 5858506 B1 | 2/2016 |
| JP | 5858507 B1 | 2/2016 |
| JP | 2019512909 A | 5/2019 |
| KR | 20110012085 A | 2/2011 |
| KR | 101544722 B1 | 8/2015 |
| KR | 101579232 B1 | 1/2016 |
| KR | 20160009716 A | 1/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012053491 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |

(56) References Cited

FOREIGN PATENT DOCUMENTS

| WO | 2015194798 A1 | 12/2015 |
|---|---|---|
| WO | 2016022864 A2 | 2/2016 |
| WO | 2016137360 A2 | 9/2016 |
| WO | 2016137499 A1 | 9/2016 |
| WO | 2016161073 A1 | 10/2016 |
| WO | 2017006134 A1 | 1/2017 |
| WO | 2017112664 A1 | 6/2017 |

OTHER PUBLICATIONS

Ethereum, "EIP-20: Token Standard," retrieved from https://eips.ethereum.org/EIPS/eip-20, Nov. 19, 2015, 5 pages.
European Communication pursuant to Article 94(3) EPC mailed Jan. 2, 2020, Patent Application No. 18166910.2-1218, filed Feb. 16, 2017, 4 pages.
European Communication pursuant to Article 94(3) EPC mailed Jul. 1, 2019, Application No. 17707121.4-1218, filed Feb. 14, 2017, 6 pages.
Extended European Search Report mailed Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Franco, "Understanding Bitcoin: Cryptography, Engineering and Economics," Wiley, ISBN: 978-1-119-01916-9, Oct. 2014, 144 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
Fujimura et al., "Bright: A Concept for a Decentralized Rights Management System Based on Blockchain," 2015 IEEE 5th International Conference on Consumer Electronics-Berlin (ICCE-Berlin), Sep. 6, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Github, "Bitcoin/Bips," retrieved from http://web.archive.org/web/20150307191218/https://github.com/bitcoin/bips/blob/master/bip-0016.mediawiki, Apr. 5, 2014, 4 pages.
github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Goldfeder et al., "Securing Bitcoin Wallets via a New DSA/ECDSA threshold signature scheme, " manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hacker News, "Cryptocontracts Will Turn Contract Law into a Programming Language," retrieved from https://news.ycombinator.com/item?id=7287155, Feb. 23, 2014, 12 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion mailed Apr. 10, 2017, Patent Application No. PCT/IB2017/050861, 11 bages.
International Search Report and Written Opinion mailed Apr. 12, 2017, Patent Application No. PCT/IB2017/050818, 10 pages.
International Search Report and Written Opinion mailed Apr. 12, 2017, Patent Application No. PCT/IB2017/050829, 9 pages.
International Search Report and Written Opinion mailed Apr. 12, 2017, Patent Application No. PCT/IB2017/050866, 10 pages.
International Search Report and Written Opinion mailed Apr. 21, 2017, Patent Application No. PCT/IB2017/050820, 12 pages.
International Search Report and Written Opinion mailed Apr. 26, 2017, International Patent Application No. PCT/IB2017/050865, filed Feb. 16, 2017, 9 pages.
International Search Report and Written Opinion mailed Apr. 3, 2017, Patent Application No. PCT/IB2017/050824, filed Feburary 14, 2017, 13 pages.
International Search Report and Written Opinion mailed Apr. 3, 2017, Patent Application No. PCT/IB2017/050827, 10 pages.
International Search Report and Written Opinion mailed Apr. 3, 2017, Patent Application No. PCT/IB2017/050827, 13 pages.
International Search Report and Written Opinion mailed Aug. 3, 2018, Patent Application No. PCT/IB2018/053289, 10 pages.
International Search Report and Written Opinion mailed Mar. 29, 2017, Patent Application No. PCT/IB2017/050821, 10 pages.
International Search Report and Written Opinion mailed Mar. 29, 2017, Patent Application No. PCT/IB2017/050821, 13 pages.
International Search Report and Written Opinion mailed Mar. 30, 2017, Patent Application No. PCT/IB2017/050819, 13 pages.
International Search Report and Written Opinion mailed Mar. 30, 2017, Patent Application No. PCT/IB2017/050825, 9 pages.
International Search Report and Written Opinion mailed May 29, 2017, International Patent Application No. PCT/IB2017/050815, filed Feb. 14, 2017, 10 pages.
International Search Report and Written Opinion mailed May 31, 2017, Patent Application No. PCT/IB2017/050856, filed Feb. 16, 2017, 11 pages.
International Search Report and Written Opinion mailed May 31, 2017, Patent Application No. PCT/IB2017/050867, 11 pages.

(56) References Cited

OTHER PUBLICATIONS

International Search Report and Written Opinion mailed May 31, 2017, Patent Application No. PCT/IB2017/050979, filed Feb. 21, 2017, 11 pages.
International Search Report and Written Opinion mailed May 31, 2017, Patent Application No. PCT/IB2017/050980, 12 pages.
Japanese Notice of Reason(s) for Rejection mailed Mar. 30, 2021, Patent Application No. 2018-539890, 8 pages.
Japanese Notice of Reason(s) for Rejection mailed Mar. 30, 2021, Patent Application No. 2018-539893, 6 pages.
Japanese Office Action mailed Feb. 16, 2021, Patent Application No. 2018-539331, 7 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users. For services that can share the excitement of competitions around the world," NTT Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_RETURN data TxOut as standard transaction type. #2738," Github, Jun. 4, 2013, https://github.com/bitcoin/bitcoin/pull/2738, 12 pages.
Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitcoin Stats," retrieved from http://bitcoinstats.com/irc/bitcoin-dev/logs/2015/03/27, Mar. 27, 2015, 11 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Australian Office Action for Application No. 2017223158, mailed Jun. 22, 2021, 7 pages.
Bitcoin Forum, "Counterparty—Pioneering Peer-to-Peer Finance", https://bitcointalk.org/index.php?topic=395761.0, Feb. 1, 2014, 7 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitfreak! et al., "Understanding Stealth Addresses/Payments," Bitcoin Forum, Jun. 10, 2015 (retrieved Jun. 16, 2020), https://bitcointalk.org/index.php?topic=1086498.0, 8 pages.
BitFury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Block_Chan, "Tweet dated Nov. 7, 2018," Twitter, Nov. 7, 2018, https://twitter.com/block_chan/status/1060336404163584000, 1 page.
Bluematt, "Contract", Bitcoin Wiki, Oct. 22, 2015, 12 pages.
Bluematt, http://bitcoinstats.com/irc/bitcoin-dev/logs/2015/03/16.

Bradbury, "Developers Battle Over Bitcoin Block Chain," Coindesk, http://www.coindesk.com/developers-battle-bitcoin-block-chain/, Mar. 25, 2014, 3 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Brown, "On Distributed Satabases and Distributed Ledgers", Thoughts on the Future of Finance, Nov. 8, 2016, https://gendal.me/page/3/, 44 pages.
Burgess et al., "The Promise of Bitcoin and the Blockchain," Consumers' Research, Jul. 13, 2015, 97 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Buterin, "Bitcoin Multisig Wallet: The Future Of Bitcoin," Bitcoin Magazine, Mar. 13, 2014 [retrieved May 12, 2020], https://bitcoinmagazine.com/articles/multisig-future-bitcoin-1394686504, 7 pages.
Buterin, "Introducing Ethereum Script 2.0", Ethereum Foundation Blog, Feb. 3, 2014, 9 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assessts-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Countyparty, "The Counterparty Protocol," retrieved from https://github.com/jsimnz/Counterparty/blob/master/README.md, Jan. 8, 2014, 6 pages.
crpit.com, FYJC Mumbai 11th Online Admission 2021—Part-1, 2 Admission Form (mumbai.11thadmission.Org.in), https://crpit.com, Jul. 6, 2021 8 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.

(56) References Cited

OTHER PUBLICATIONS

Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode, "New Kid on the Blockchain," Hacker News, https://news.ycombinator.com/item?id=11372455, Mar. 28, 2016 [Dec. 12, 2018], 32 pages.
Drwasho, "Openbazaar Documentation", Github, Jun. 2015, 53 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2l91/time_to_lobby_bitcoins_core_devs_sf_bitcoin_devs/, Mar. 14, 2015 [Dec. 12, 2018], 21 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action mailed Apr. 12, 2021, Patent Application No. 109142412, 5 pages.
Taiwanese Office Action mailed Jul. 28, 2020, Patent Application No. 106105709, 9 pages.
Taiwanese Office Action mailed Oct. 7, 2020, Patent Application No. 106105713, 4 pages.
Tasca et al., "Digital Currencies: Principles, Trends, Opportunities, and Risks," Ecurex Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report mailed Apr. 25, 2016, Patent Application No. 11603117.1, filed Feb. 23, 2016, 11 pages.
UK Commercial Search Report mailed Feb. 17, 2017, Patent Application No. 1604493.5, 8 pages.
UK Commercial Search Report mailed Jan. 13, 2017, Patent Application No. 1604498.4, 8 pages.
UK Commercial Search Report mailed Jun. 12, 2017, Patent Application No. GB510912, 6 pages.
UK Commercial Search Report mailed Jun. 14, 2016, Patent Application No. 1607249.8, 4 pages.
UK Commercial Search Report mailed Jun. 27, 2016, Patent Application No. GB1603123.9, filed Feb. 23, 2016, 11 pages.
UK Commercial Search Report mailed Jun. 27, 2016, Patent Application No. GB1603125.4, filed Feb. 23, 2016, 11 pages.
UK Commercial Search Report mailed Jun. 28, 2016, Patent Application No. GB1603122.1, filed Feb. 23, 2016, 12 pages.
UK Commercial Search Report mailed Jun. 6, 2016, Patent Application No. 1604497.6, filed Mar. 16, 2016, 6 pages.
UK Commercial Search Report mailed Jun. 9, 2016, Patent Application No. GB1603114.8 , 4 pages.
UK Commercial Search Report mailed Jun. 9, 2016, Patent Application No. GB1603117.1, filed Feb. 23, 2016, 12 pages.
UK Commercial Search Report mailed May 16, 2016, Patent Application No. GB1603125.4, 8 pages.
UK Commercial Search Report mailed May 20, 2016, Patent Application No. 1605026.2, 4 pages.
UK Commercial Search Report mailed May 24, 2016, Patent Application No. GB1605571.7, filed Apr. 1, 2016, 3 pages.
UK Commercial Search Report mailed May 9, 2016, Patent Application No. GB1603112.2, 6 pages.
UK Commercial Search Report mailed May 9, 2016, Patent Application No. GB1603114.8, filed Feb. 23, 2016, 2 pages.
UK Commercial Search Report mailed Nov. 14, 2016, Patent Application No. GB1607063.3, 8 pages.
UK Commercial Search Report mailed Nov. 30, 2016, Patent Application No. 1607058.3, filed Apr. 22, 2016, 7 pages.
UK Commercial Search Report mailed Oct. 10, 2016, Patent Application No. GB1607484.1, filed Apr. 29, 2016, 5 pages.
UK Commercial Search Report mailed Sep. 30, 2016, Patent Application No. 1606630.0, filed Apr. 15, 2016, 7 pages.
UK Expanded Commercial Search Report mailed Jun. 15, 2016, Patent Application No. 1605026.2, 5 pages.
UK IPO Search Report mailed Dec. 12, 2016, Patent Application No. GB1606630.0, filed Apr. 15, 2016, 4 pages.
UK IPO Search Report mailed Dec. 15, 2016, Patent Application No. GB1607063.3, 6 pages.
UK IPO Search Report mailed Dec. 21, 2016, Patent Application No. GB1607058.3, 3 pages.
UK IPO Search Report mailed Dec. 21, 2016, Patent Application No. GB1607058.3, filed Apr. 22, 2016, 3 pages.
UK IPO Search Report mailed Dec. 23, 2016, Patent Application No. GB1604495.0, 5 pages.
UK IPO Search Report mailed Dec. 28, 2016, Patent Application No. GB1604497.6, filed Mar. 16, 2016, 4 pages.
UK IPO Search Report mailed Dec. 5, 2016, Patent Application No. 1607249.8, 4 pages.
UK IPO Search Report mailed Dec. 6, 2016, Patent Application No. 1604493.5, 6 pages.
UK IPO Search Report mailed Dec. 6, 2016, Patent Application No. 1607482.5, 5 pages.
UK IPO Search Report mailed Jan. 25, 2017, Patent Application No. 1605026.2, 3 pages.
UK IPO Search Report mailed Jan. 3, 2017, Patent Application No. 1604498.4, 4 pages.
UK IPO Search Report mailed Jul. 26, 2016, Patent Application No. GB1603114.8, filed Feb. 23, 2016, 5 pages.
UK IPO Search Report mailed Jul. 4, 2016, Patent Application No. GB1603125.4, filed Feb. 23, 2016, 6 pages.
UK IPO Search Report mailed Jul. 5, 2016, Patent Application No. GB1603123.9, filed Feb. 23, 2016, 5 pages.
UK IPO Search Report mailed Oct. 17, 2016, Patent Application No. GB1603117.1, filed Feb. 23, 2016, 5 pages.
UK IPO Search Report mailed Oct. 21, 2016, Patent Application No. GB1603112.2, 4 pages.
UK IPO Search Report mailed Oct. 26, 2016, Patent Application No. GB1603122.1, filed Feb. 23, 2016, 4 pages.
UK IPO Search Report mailed Oct. 9, 2017, Patent Application No. GB1707788.4, 6 pages.
UK IPO Search Report mailed Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.

(56) References Cited

OTHER PUBLICATIONS

Vietnamese Office Action mailed Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
White, "How Computers Work," Que Publishing 7th Edition, Oct. 15, 2003, 44 pages.
Whitequark, "#bitcoin-wizards on Jul. 30, 2015 irc logs at whitequark.org," whitequark.org, https://irclog.whitequark.org/bitcoin-wizards/2015-07-30, Jul. 30, 2015 [retrieved Dec. 12, 2018], 8 pages.
Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Eterum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
UK IPO Search Report mailed Dec. 21, 2016, Patent Application No. GB1607484.1, 4 pages.
Japanese Office Action mailed Jan. 22, 2019, Patent Application No. 2018-516682, filed Feb. 16, 2017, 14 pages.
Japanese Office Action mailed Oct. 6, 2020, Patent Application No. 2018-539865, 14 pages.
Japanese Office Action mailed Oct. 8, 2019, Patent Application No. 2018-539895, 9 pages.

Jesionek et al., "BIP0032: Hierarchical Deterministic Wallets," GitHub, https://github.com/bitcoin/bips/blob/master/bip-0032.mediawiki, Jan. 2014, 9 pages.
I2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78(1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.

(56) References Cited

OTHER PUBLICATIONS

Nakamoto, "Bitcoin: A Peer-to-Peer Electronic Cash System," Bitcoin, Oct. 31, 2008, https://bitcoin.org/bitcoin.pdf, 9 pages.

Noizat et al., "Blockchain Electronic Vote," retrieved from https://www.weusecoins.com/assets/pdf/library/blockchain-electronic-vote.pdf, Apr. 29, 2015, 9 pages.

Noizat, "Handbook of Digital Currency Chapter 22: Blockchain Electronic Vote," Elsevier Inc., David Lee Kuo Chuen (ed.), May 2015, 9 pages.

NXT, "Voting," nxt.org, website archived on Feb. 18, 2016 [retrieved May 31, 2022], https://web.archive.org/web/20160218021746/https://nxt.org/what-is-nxt/voting/, 3 pages.

Openchain, "Home Page," openchain.org, Dec. 22, 2015 [retrieved May 8, 2020], https://web.archive.org/web/20151222083734/https://www.openchain.org/, 18 pages.

OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.

OpenSSL Wiki, "Evp Key Agreement," OpenSSL, https://wiki.openssl.org/index.php/EVP_Key_Agreement, Apr. 28, 2017 [retrieved Dec. 10, 2018], 2 pages.

Perry, "Tapeke: Bitcoin Accounting for Non-Accountants," http://codinginmysleep.com/tapeke-bitcoin-accounting-for-non-accountants/, Jan. 21, 2015, 1 page.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.

Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.

Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.

Rockwell, "BitCongress—Process For Blockchain Voting & Law," retrieved from http://generalbitcoin.com/BitCongress_Whitepaper.pdf, Feb. 12, 2016, 8 pages.

Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.

Sams, "Ethereum: Turing-complete, programmable money," Cryptonomics, Feb. 1, 2014, https://cryptonomics.org/2014/02/01/ethereum-turing-complete-programmable-money, 4 pages.

Sanchez, "Marketplaces," GitHub, Jun. 10, 2015 [retrieved May 12, 2020], https://github.com/drwasho/openbazaar-documentation/blob/master/04%20Marketplaces.md, 37 pages.

Sanchez, "Protocol," Github, https://github.com/drwasho/openbazaar-documentation/blob/master/03%20Protocol.md, Jun. 15, 2015, 53 pages.

Sanchez, "Ricardian Contracts in OpenBazaar," Github, https://gist.github.com/drwasho/a5380544c170bdbbbad8, Jan. 2016, 12 pages.

Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.

Satoshi et al., "Connection Limits," Bitcoin Forum, Aug. 9, 2010, https://bitcointalk.org/index.php?topic=741.0; prev_next=prev, 2 pages.

Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.

Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.

Snow et al., "Factom: Business Processes Secured by Immutable Audit Trails on the Blockchain Version 1.2," factom.com, Apr. 25, 2018, 38 pages.

Gutoski et al., "Hierarchical Deterministic Bitcoin Wallets That Tolerate Key Leakage", Lecture Notes in Computer Science book series (LNSC, vol. 8975), Jan. 1, 2015, 9 pages.

Mirzadeh et al., "CPFP: An Efficient Key Management Scheme for Large Scale Personal Networks", IEEE, 2008, 6 pages.

Menezes et al., "Handbook of Applied Cryptography," CRC Press, Oct. 16, 1996, 811 pages.

Deloitte, "Blockchain Technology A Game-changer in Accounting", Mar. 2016, 5 pages.

Lazarovich, Amir, "Invisible Ink: Blockchain for Data Privacy", May 8, 2015, 85 pages.

Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.

Subramanian, et al., "The State of Cryptocurrencies, Their Issues and Policy Interactions", International Information Management Association, vol. 24, No. 24, No. 3, 2015, pp. 25-40.

Greenspan, Dr. Gideon, "MultiChain Private Blcokchain", White Paper, Jun. 2015, 17 pages.

Swanson, Tim, "Watermarked Tokens and Pseudonymity on Public Blockchains", Nov. 4, 2015, 78 pages.

Manabu Takata et al., "Nikkei BP Mook, FinTech Revolution, Financial Common Sense Dissolved by Technology", Nikkei Business Publications, Inc., Jan. 27, 2016, ISBN: 978-4-8222-7188-6, pp. 44-47.

Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.

Bitfury Group, "Public Versus Private Blockchains", Part 2: Permissionless Blackchains, in collaboration with Jeff Garzik, Version 1.0, Oct. 20, 2015, 20 pages.

Gauthierdickey, et al. "Secure Peer-to-Peer Trading in Small and Large Scale Multiplayer Games", Multimedia Systems, Apr. 29, 2014, 13 pages.

Feng et al., "A Next Generation Cryptocurrency Platform Ethereum and Its Evaluation", Oct. 14, 2015, 12 pages.

Ramaswami, U., et al., "Genotype and Phenotype in Hypochondroplasia", 1998, Mosby, Inc., 5 pages.

UK Commercial Search Report mailed Jan. 18, 2017, Patent Application No. GB510135, filed Mar. 16, 2016, 5 pages.

Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.

The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 pages.

Antonopoulos, "Mastering Bitcoin, Chapter 4, Keys, Addresses, Wallets", O'Reilly, Dec. 20, 2014, 34 pages.

Omnilayer, Omni Protocol Specification (formerly Mastercoin), retrieved from https://github.com/OmniLayer/spec/blob/9978cc3984ae0b6e51216c4ae74042fc4097b993/README.md on Apr. 19, 2024, 58 pages.

Vroblefski et al., "Managing User Relationships in Hierarchies for Information System Security", Science Direct, Decision Support System 43, 2007, 12 pages.

Wikipedia, "Diffie-Hellman Key Exchange," retrieved from https://en.wikipedia.org/w/index.php?title=Diffie%E2%80%93Hellman_key_exchange&oldid=759611604, Jan. 2017, 10 pages.

Nikkei Business Publications, Inc., "Blockchain & Bitcoin", 2016, 4 pages.

(56) References Cited

OTHER PUBLICATIONS

Bitcoin Wiki, "Contract," Bitcoin Wiki, https://en.bitcoin.it/w/index.php?title=Contract&oldid=59172, May 22, 2011 (updated dated Oct. 22, 2015) [retrieved Jan. 8, 2024], 2 pages.

Fromknecht Conner, et al., "A Decentralized Public Key Infrastructure with Identity Retention" Nov. 11, 2024, 16 pages.

Buterin, "Ethereum White Paper", A Next Generation Smart Contract & Decentralized Application Platform, 2014, 36 pages.

Fuchita, Yasuyuki, "Special Feature: Innovation and Finance-Blockchain and Financial Transaction Innovation", Nomura capital markets quarterly, Japan, Nomura Institute of Capital Markets Research, Nov. 1, 2015, vol. 19, No. 2 (consecutive number of issue 74), (with English Translation), 59 pages.

\* cited by examiner

BLOCKCHAIN-IMPLEMENTED METHOD FOR CONTROL AND DISTRIBUTION OF DIGITAL CONTENT

CROSS-REFERENCE TO RELATED APPLICATIONS

This application is a continuation of U.S. patent application Ser. No. 16/079,091, filed Aug. 22, 2018, entitled "BLOCKCHAIN-IMPLEMENTED METHOD FOR CONTROL AND DISTRIBUTION OF DIGITAL CONTENT," which is a 371 of International Patent Application No. PCT/IB2017/050978, filed Feb. 21, 2017, entitled, "BLOCKCHAIN-IMPLEMENTED METHOD FOR CONTROL AND DISTRIBUTION OF DIGITAL CONTENT," which claims priority to United Kingdom Patent Application No. 1603117.1, filed Feb. 23, 2016, entitled "DETERMINING A COMMON SECRET FOR TWO BLOCKCHAIN NODES FOR THE SECURE EXCHANGE OF INFORMATION," and United Kingdom Patent Application No. 1607484.1, filed Apr. 29, 2016, entitled "PAYMENT AND DISTRIBUTION OF DIGITAL CONTENT," and United Kingdom Patent Application No. 1619301.3, filed Nov. 15, 2016, entitled "DETERMINING A COMMON SECRET FOR TWO BLOCKCHAIN NODES FOR THE SECURE EXCHANGE OF INFORMATION," the disclosures of which are incorporated herein by reference in their entirety.

TECHNICAL FIELD

The present disclosure relates to a system and methods of payment and distribution of digital content from a series of digital content. The present disclosure may have application for digital rights management for online digital media but is not limited in this regard.

BACKGROUND

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

Digital rights management concerns controlling digital media that is subject to copyright, including control technology to restrict the use, modification and distribution of digital media. Digital media may include content that is serialised, such as sequential content like a magazine, newspaper, podcasts, soap opera, television series, etc.

Implementation of digital rights management may include management of copyright work through a larger central system or multiple systems, with key exchange to create trust between nodes associated with respective users. Such systems may be hard to manage and ongoing maintenance of access rights may be difficult to achieve. In some alternatives, a trusted third party (such as certificate authorities) may be used to create hierarchies. However some of these systems may create large single points of failure that may be vulnerable to attack.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

The present invention provides methods and systems as defined in the appended claims.

The invention may provide a control method and corresponding system, arranged to control the transmission and/or distribution of data. The transmission may be conducted via or over a computer-implemented or telecommunications network. The data may be digital content. The invention may provide a method/system which incorporates cryptographic and/or encryption techniques to secure the distribution/transmission of the data. Thus, the invention may provide an enhanced security solution for the communication of data.

The term "episode" may be used interchangeably herein with the term "portion". However, the digital content that is transmitted, distributed and/or controlled by the invention may not be limited to an instalment, logical chapter or episode of broadcast media or artistic content. The term "episode" herein and in the claims simply means "portion" or "unit" or "amount" of digital content. Similarly, the term "series" is not used herein to mean simply a series in the sense of broadcast series. The series may simply be a plurality, group or association of portions of digital content. "Series" is not limited to or necessarily indicative of sequential or chronological order. In addition, the invention is not limited with regard to the nature or form of the digital content. The digital content may not be limited to entertainment media, but may relate to any type of digital content.

The invention may provide a system wherein a first user is associated with a quantity of cryptocurrency at a common address. The cryptocurrency may be referred to as a "deposit quantity". The address may be an address on a network. It may be a blockchain address. It may be derived from or associated with a cryptographic key. To spend from the common address may require (digital) signatures of at least a first private key ($V_1$) of the first user and a second private key ($V_2$) of the second user. This may be specified by the use of given type of blockchain transaction. The transaction type may be part of, or defined within, a blockchain protocol.

The system may comprise:
a first node associated with a first user comprising a first processing device configured to:
(A) send, over a communications network, a request to the second node to provide an episode of digital content (i) from a series of digital content;
(B) determine and/or generate a blockchain transaction ($E_i$) to transfer from a common address a payment quantity of cryptocurrency (B2) to the second user, wherein the payment quantity of cryptocurrency (B2) is based on a quantity of episodes of digital content in the series of digital content requested by the first user; and
(C) sign, with the first private key ($V_1$), the payment transaction ($E_i$) and subsequently send the payment transaction ($E_i$) to the second node;
a second node associated with the second user comprising a second processing device configured to:
(I) receive, over the communications network, the request from the first node to provide the episode of digital content (i) and the payment transaction ($E_i$), signed with the first private key ($V_1$);
(II) verify the payment transaction, comprising verifying that the payment transaction includes the payment quantity of cryptocurrency (B2) to the second user, and based on the result of verifying the second processing device is further configured to:
(III) provide access, over the communications network, to the episode of digital content (i) to be available to the first node; and
(IV) co-sign, with the second private key ($V_2$) of the second user, the payment transaction and send the co-signed payment transaction to a peer-to-peer distributed ledger.

In the system, the first processing device may be further configured to request a next episode of digital content from the series of digital content by repeating steps (A) to (C). The second processing device may be further configured to receive the request and distribute the next episode of digital content by repeating steps (I) to (III), wherein the step (IV) to co-sign and send the payment transaction to the peer-to-peer distributed ledger performed on a payment transaction having a quantity of episodes of digital content that includes the next episode.

Advantageously, one of the benefits offered by the invention is that each portion of digital content is encrypted along with a cryptographic key for (or associated with) a further or subsequent portion. Use of the key provides technical evidence that the portion of digital content has been decrypted. Therefore, it can be determined that the digital content has been accessed e.g., viewed or somehow consumed/used.

In the system, the first user may deposit the deposit quantity of cryptocurrency (B1) at the common address with the first processing device that is configured to: send, over a communications network, a first data output (O1) to record, on a peer-to-peer distributed ledger (which may hereafter be referred to simply as a "blockchain"), a first transaction of the deposit quantity of cryptocurrency (B1) from the first user to the common address.

In the system, after a specified time without a transaction of the deposit quantity of cryptocurrency from the common address, the deposit quantity of cryptocurrency (B1) may be refunded. The first processing device may be further configured to co-sign, with a first private key ($V_1$) of the first user, a second transaction to transfer the deposit quantity of cryptocurrency (B1) from the common address to the first user. The second processing device may be further configured to co-sign, with the second private key ($V_2$), the second transaction, wherein the co-signed second transaction with both the first private key ($V_1$) and the second private key ($V_2$) is sent to the peer-to-peer distributed ledger and is valid after the specified time to refund the deposit quantity of cryptocurrency (B1); and send the co-signed payment transaction to the peer-to-peer distributed ledger before the specified time.

In the system, the second processing device may be further configured to: send, over the communications network, an episode secret ($S_i$) associated the episode of digital content from the series of digital content that is available to be requested by the first user. The first processing device may be further configured to: receive, over the communications network, the episode secret ($S_i$); determine an episode secret hash ($H_i$) from the episode secret ($S_i$). To determine a payment transaction ($E_i$) to transfer the payment quantity of cryptocurrency (B2) to the second user includes the first processing device to configured to further determine a payment redeem script (RS1) based on: the episode secret hash ($H_i$); and a second public key ($P_2$) that is a cryptographic pair with the second private key ($V_2$) of the second user. When the second processing device verifies the payment transaction ($E_i$), the second processing device is further configured to verify that the payment redeem script (RS1) is based on the episode secret hash ($H_i$) and the second public key ($P_2$).

In the system, the second processing device may be further configured to: determine a next episode secret ($S_{i+1}$) associated with the next episode ($S_{i+1}$) of digital content from the series of digital content; determine a next episode secret hash ($H_{i+1}$) from the next episode secret ($S_i$); wherein at, or after, step (III) to send the episode of digital content, the second processing device is further provided to send, over the communications network, a next episode secret ($S_{i+1}$) to the first node. The first processing device may be further configured to: receive, over the communications network, the next episode secret ($S_{i+1}$); determine a next episode secret hash ($H_{i+1}$) from the next episode secret ($S_{i+1}$). A corresponding next payment transaction ($E_{i+1}$) includes a next payment redeem script (RS2) based on: the next episode secret hash ($H_{i+1}$); and the second public key ($P_2$). When the second processing device verifies a next payment transaction ($E_{i+1}$), the second processing device is further configured to verify that the next payment redeem script (RS2) is based on the next episode secret hash ($H_{i+1}$) and the second public key ($P_2$).

In the system, the payment transaction ($E_i$) may further comprise a transfer from the common address to the first user a change quantity of cryptocurrency (B3) to the first user, wherein the change quantity of cryptocurrency (B3) is based on the deposit quantity of cryptocurrency (B1) less the payment quantity of cryptocurrency (B2).

In the system, the second processing device may be further configured to determine a common secret between the first node and the second node. To provide access, over the communications network, to the episode of digital content further includes the second processing device to: encrypt one or more episode of digital content with a key based on the common secret to provide one or more encrypted episodes of digital content; and to send the one or more encrypted episodes of digital content. The first processing device may be further configured to: determine a common secret between the first node and the second node; receive, over the communications network, the one or more encrypted episodes of digital content; and decrypt the one or more encrypted episodes of digital content with the key based on the common secret to provide the one or more episodes of digital content.

In the system, the second processing device may be further configured to determine an encrypted message based on the episode secret ($S_i$), and/or the next episode secret ($S_{i+1}$) that is encrypted with a key based on the common secret. The first processing device may be further configured to determine the episode secret ($S_i$), and/or the next episode secret ($S_{i+1}$), by decrypting an encrypted message with a key based on the common secret.

A computer-implemented method of receiving digital content, wherein a first node associated with a first user receives digital content in return for payment to a second user associated with a second node, wherein the first user is associated with a deposit quantity of cryptocurrency (B1) at a common address, wherein to spend from the common address requires signatures of both a first private key ($V_1$) of the first user and a second private key ($V_2$) of the second user, the method comprising:

(A) sending, over the communications network, a request to the second node to provide an episode of digital content (i) from a series of digital content;

(B) determining a payment transaction ($E_i$) to transfer from the common address a payment quantity of cryptocurrency (B2) to the second user, wherein the payment quantity of cryptocurrency (B2) is based on a quantity of episodes of digital content in the series of digital content requested by the first user;

(C) signing, with the first private key ($V_1$), the payment transaction ($E_i$) and subsequently sending the payment transaction ($E_i$) to the second node to cause the second node to verify the payment transaction;

wherein based on the second node having verified that the payment transaction includes the payment quantity of cryptocurrency (B2), the method further comprises:

(D) accessing, over the communications network, the episode of digital content (i).

The method may further comprise requesting a next episode of digital content from the series of digital content by repeating the steps (A) to (D).

The method may further comprise the first user to deposit the deposit quantity of cryptocurrency (B1) at the common address with the step of sending, over a communications network, a first data output (O1) to record, on a peer-to-peer distributed ledger, a first transaction of the deposit quantity of cryptocurrency (B1) from the first user to the common address.

In a further example of the method, after a specified time without a transaction of the deposit quantity of cryptocurrency (B1) from the common address, the deposit quantity of cryptocurrency (B1) is refunded, and wherein the method further comprises: co-signing, with the first private key ($V_1$) of the first user, a second transaction to transfer the deposit quantity of cryptocurrency (B1) from the common address to the first user, wherein the co-signed second transaction, co-signed by the second user with the second private key ($V_2$), is sent to the peer-to-peer distributed ledger and is valid after the specified time to refund the deposit quantity of cryptocurrency (B1).

The method may further comprise: receiving, over the communications network, an episode secret ($S_i$) associated with the episode of digital content from the series of digital content that is available to be requested by the first user; determining an episode secret hash ($H_i$) from the episode secret ($S_i$). The payment quantity of cryptocurrency (B2) to the second user in the payment transaction ($E_i$) includes a payment redeem script (RS1) based on: the episode secret hash ($H_i$); and a second public key ($P_2$) that is a cryptographic pair with the second private key ($V_2$) of the second user.

In the method at, or after, step (D), the method further may further comprise: receiving, over the communications network, a next episode secret ($S_{i+1}$) associated with the next episode ($S_{i+1}$) of digital content from the series of digital content. Requesting the next episode from the series of digital content comprises determining a next episode secret hash ($H_{i+1}$) from the next episode secret ($S_{i+1}$), and wherein a corresponding next payment transaction ($E_{i+1}$) includes a next payment redeem script (RS2) based on: the next episode secret hash ($H_{i+1}$); and the second public key ($P_2$).

In the method, the payment transaction ($E_i$) may further comprise a transfer from the common address to the first user a change quantity of cryptocurrency (B3), wherein the change quantity of cryptocurrency (B3) is based on the deposit quantity of cryptocurrency (B1) less the payment quantity of cryptocurrency (B2).

The method may further comprise: determining a common secret between the first node and the second node; and wherein accessing, over the communication network, the episode of digital content comprises: receiving, over the communications network, an encrypted episode of digital content; and decrypting the encrypted episode of digital content with a key based on the common secret to provide the episode of digital content.

When receiving the episode secret ($S_i$), and/or the next episode secret ($S_{i+1}$), the method may further comprise determining the episode secret ($S_i$), and/or the next episode secret ($S_{i+1}$), by decrypting an encrypted message with a key based on the common secret.

A computer-implemented method of distributing digital content, wherein a first node associated with a first user receives digital content in return for payment to a second user associated with a second node, wherein the first user is associated with a deposit quantity of cryptocurrency (B1) at a common address wherein to spend from the common address requires signatures of both a first private key ($V_1$) of the first user and a second private key ($V_2$) of the second user, the method-comprising:

(I) receiving, over the communications network, a request from the first node to provide an episode of digital content (i) from a series of digital content;

(II) receiving a payment transaction ($E_i$), signed with the first private key ($V_1$), to transfer from the common address a payment quantity of cryptocurrency (B2) to the second user, wherein the payment quantity of cryptocurrency (B2) is based on a quantity of episodes of digital content in the series of digital content requested by the first user;

(III) verifying the payment transaction, comprising verifying that the payment transaction includes the payment quantity of cryptocurrency (B2) to the second user, wherein based on a result of verifying the method further comprises:

(IV) providing access, over the communications network, to the episode of digital content (i) to the first node; and (V) co-signing, with the second private key ($V_2$) of the second user, the payment transaction and sending the co-signed payment transaction to the peer-to-peer distributed ledger.

The method may further comprise distributing a next episode of digital content from the series of digital content by repeating steps (I) to (IV) wherein step (V) is performed on a payment transaction a quantity of episodes of digital content that includes the next episode.

In one example of the method, after a specified time without a transaction of the deposit quantity of cryptocurrency from the common address, the deposit quantity of cryptocurrency (B1) is refunded to the first user. Accordingly, the method may further comprises co-signing, with the second private key ($V_1$) of the second user, a second transaction to transfer the deposit quantity of cryptocurrency (B1) from the common address to the first user, wherein the co-signed second transaction, co-signed by the first user with the first private key ($V_1$), is sent to the peer-to-peer distributed ledger and is valid after the specified time to refund the deposit quantity of cryptocurrency (B1). Furthermore, the step of sending the co-signed payment transaction to the peer-to-peer distributed ledger is performed before the specified time.

The method may further comprise: sending, over the communications network, an episode secret ($S_i$) associated the episode of digital content from the series of digital content that is available to be requested by the first user; and determining an episode secret hash ($H_i$) from the episode secret ($S_i$). The step of verifying the payment transaction ($E_i$) comprises verifying that a corresponding payment redeem script (RS1) to transfer the payment quantity of cryptocurrency (B2) to the second user is based on: the episode secret hash ($H_i$); and a second public key ($P_2$) that is a cryptographic pair with the second private key ($V_2$) of the second user.

The method may further comprise: determining a next episode secret ($S_{i+1}$) associated with the next episode ($S_{i+1}$) of digital content from the series of digital content; and determining a next episode secret hash ($H_{i+1}$) from the next episode secret ($S_i$). At, or after, step (IV), the method may further comprise sending, over the communications network, a next episode secret ($S_{i+1}$) to the first node. When verifying a next payment transaction for the next episode, the method further comprises verifying that a next payment redeem script (RS2) to transfer the next payment quantity of cryptocurrency to the second user is based on: the next episode secret hash ($H_{i+1}$) and the second public key ($P_2$).

In the method, the payment transaction ($E_i$) may further comprise a transfer from the common address to the first user a change quantity of cryptocurrency (B3) to the first user, wherein the change quantity of cryptocurrency (B3) is based on the deposit quantity of cryptocurrency (B1) less the payment quantity of cryptocurrency (B2).

The method may further comprise: determining a common secret between the first node and the second node. The step of providing access, over the communications network, to the episode of digital content may comprise: encrypting the episode of digital content with a key based on the common secret; and—sending, over the communications network, the encrypted episode of digital content.

In the method, the step of sending the episode secret ($S_i$), and/or the next episode secret ($S_{i+1}$), may further comprise: determining an encrypted message based on the episode secret ($S_i$), and/or the next episode secret ($S_{i+1}$) that is encrypted with a key based on the common secret.

Any embodiment of the invention described above may comprise a method for determining a secret common to a first and a second node, and/or a system arranged to perform such a method. The method may comprise (or the system may be operative to perform) the following steps:

determining a first node second private key based on at least a first node mater private key and a generator value;

determining a second node second private key based on at least a second node master private key and the generator value;

wherein:

determining the common secret (CS) at the first node may be based on the first node second private key and the second node second public key, and determining the common secret (CS) at the second node may be based on the second node second private key and the first node second public key;

and wherein:

the first node second public key and the second node second public key may be respectively based on at least the first/second node master key and the generator value.

The generator value may be a message, or derived from a message. It may be derived from metadata stored in a blockchain transaction (Tx).

A device comprising a processing device to perform any one of the methods described above.

A computer program comprising machine-readable instructions to cause a processing device to implement any one of the methods as described above.

Any feature described in respect of one embodiment or aspect of the invention may also apply to one or more other embodiments/aspects of the invention. Any feature described in relation to a system of the invention may be applied to a method of the invention and vice versa.

BRIEF DESCRIPTION OF DRAWINGS

Examples of the present disclosure will be described with reference to.

DESCRIPTION OF EMBODIMENTS

Overview

Figure 1:
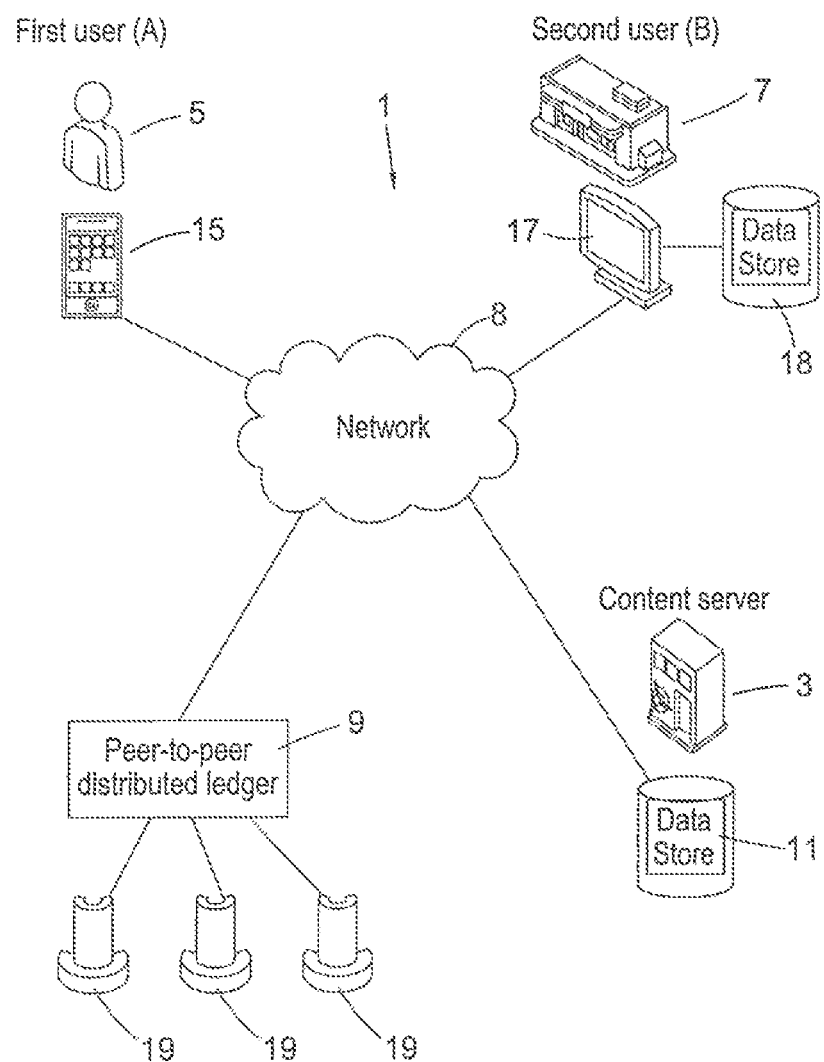
FIG. 1 is a schematic diagram of an example system to distribute digital content.

A system, devices and methods for controlling the distribution and transmission of digital content from one node and receiving the digital content at another node will now be described. FIG. 1 illustrates a system 1 that includes a first node 15 associated with a first user 5 that is in communication, over a communications network 8, with a second node 17 associated with a second user 7. In this example, the first user 5 can request to receive digital content at the first node 15 and the second user 7, via the second node 17, provides access to the digital content. The second node 17 may provide access to the digital content in a number of ways including: sending digital content from a first data store 18 to the first node 15; and making digital content at a second data store 11 associated with a content server 3 available, via the communication network 8, to the first node 15.

The first node 15 and/or second node 17 are in communication, over the communications network 8, with a peer-to-peer distributed ledger (blockchain) 9. The blockchain 9 may be associated with one or more processing devices 19 to receive and record transactions. An example of a peer-to-peer distributed ledger includes the blockchain, which is a distributed ledger of transactions (Txs) based on the Bitcoin protocol. Thus the processing device 19 associated with the ledger may be processing devices used by, or associated with, "miners".

Figure 2:
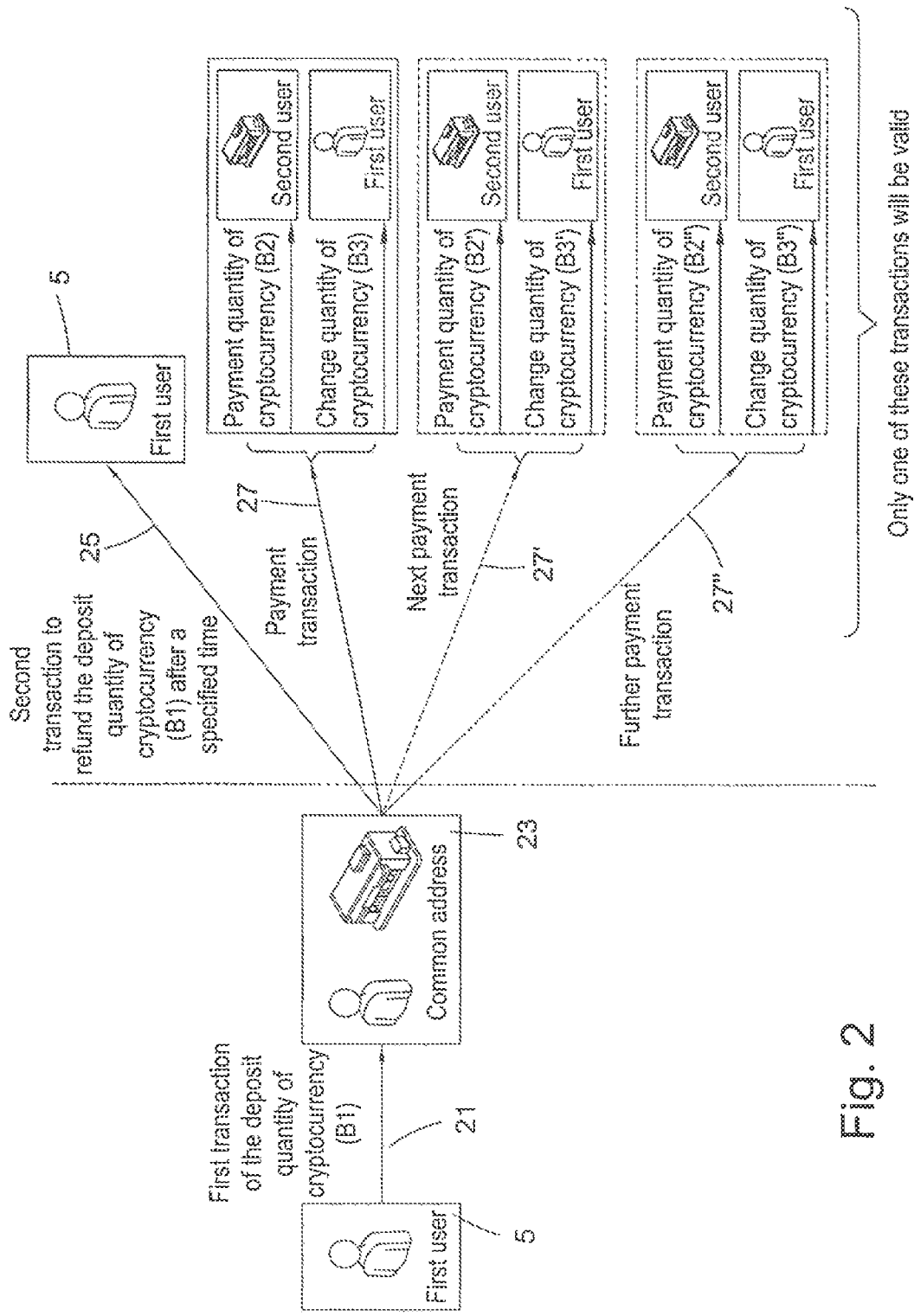
FIG. 2 is a diagram illustrating transactions between a first user, a second user, and a common address.

Referring to FIG. 2, the first user 5 may wish to purchase an unknown number of digital content from a series of digital content from the second user 7. Before making digital content available to the first user 5, the second user 7 requires a deposit to provide confidence that the second user 7 will be paid for the digital content.

To provide the deposit, the first user 5 may perform a first transaction 21 to transfer a deposit quantity of cryptocurrency (B1) to a common address 23. The common address 23 may be a pay-to-script-hash (P2SH) address according the Bitcoin protocol, and spending from the common address 23 requires signatures of both a first private key ($V_1$) of the first user 5 and a second private key ($V_2$) of the second user 7. That is a transaction from the common address 23 must be signed by both the first user 5 and second user 7 and thereby both sides can have confidence that the deposit will not be spent without authority from both sides. It is to be appreciated that alternative multi-signature methods may be used to authorise a transaction from the common address 23.

In some examples, the deposit may be time limited whereby if the first user 5 does not make a request to receive episodes of digital content within a specified time (and/or other condition), the deposit is refunded back to the first user 5. An example of this is shown in FIG. 2 as a second transaction 25 that refunds the deposit quantity of cryptocurrency (B1) to the first user 5. In some examples, this may be achieved by having both the first user 5 and second user 7 to co-sign a second transaction from the common address (23) to the first user 5, where the second transaction is only valid after a specified time. For examples, the specified may be d days in the future expressed in Unix time. This second transaction is then broadcast, where it will become a valid transaction after the specified time.

Therefore if a competing transaction to spend the deposit quantity of cryptocurrency (B1) from the common address is broadcast before the specified time, that competing transaction will be the valid transaction. It is in the interest of the second user 7 to broadcast a valid competing transaction before the specified time, after which the deposit quantity of cryptocurrency (B1) will be refunded back to the first user (5). In the present example, these competing transactions are called payment transactions 27, 27', 27" as they represent transactions where the second user 7 could receive payment.

Figure 3:
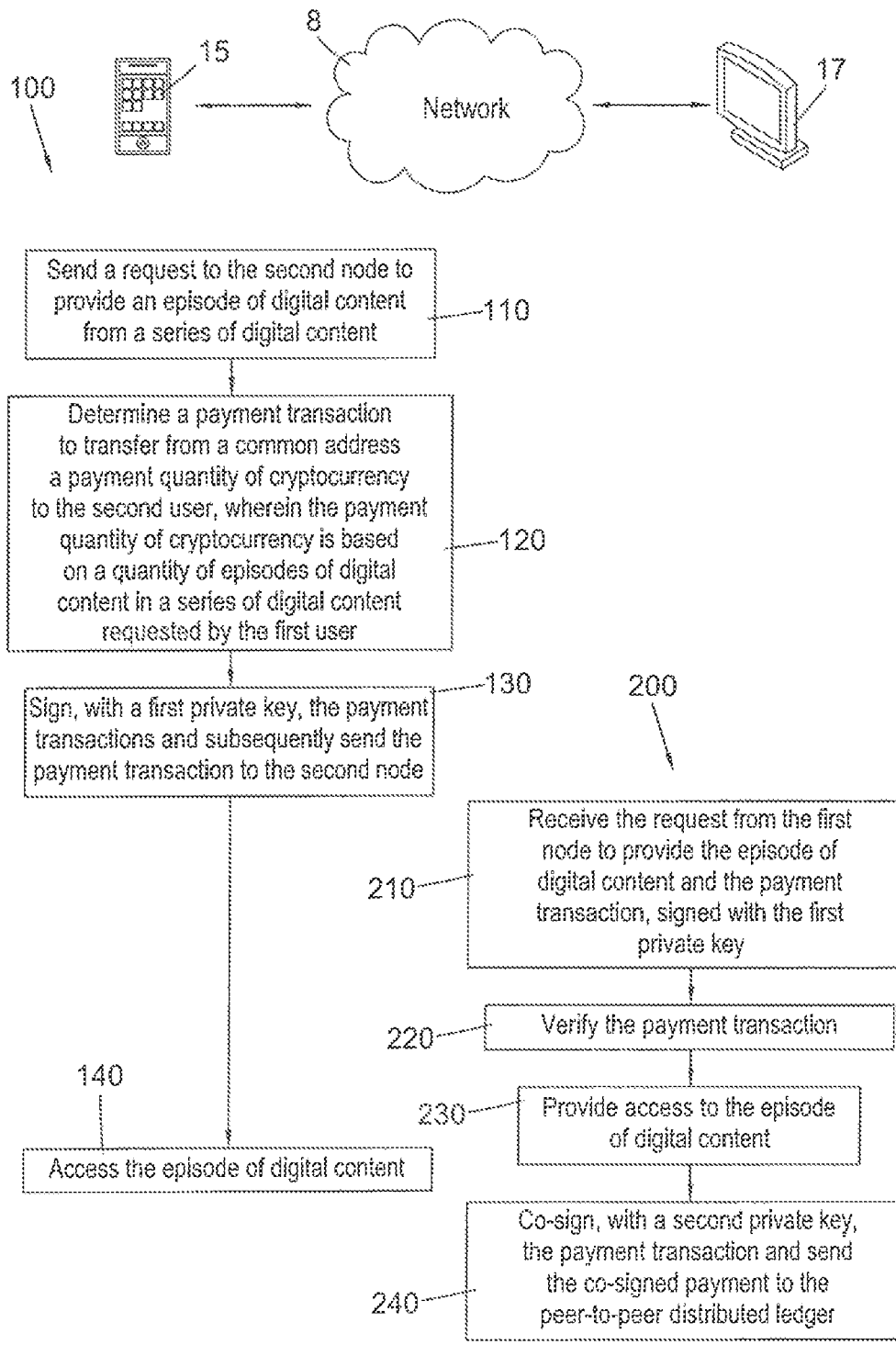
FIG. 3 is a flow chart of computer-implemented methods for distributing and receiving digital content.

A brief example of how distributing the digital content, including creating the payment transaction 27, will now be described with reference to FIG. 3 that shows the respective methods 100, 200 performed by the first node 15 and second node 17.

The first user 5, upon wanting to receive an episode of digital content from a series of digital content, uses the first node 15 to make a request for digital content. The first node 15 (which may be a computer, a mobile communication device, a television, etc.) includes a first processing device 23 that sends 110, over the communications network 8, the request to the second node 15 to provide the episode of digital content.

The first node 15 also determines 120 a payment transaction ($E_i$) 27 to transfer from the common address (23) a payment quantity of cryptocurrency (B2) to the second user 7. The payment quantity (B2) is based on a quantity of episodes of digital content in the series of digital content requested by the first user 5. This may include the episodes that have been requested previously (and received) but where payment has not been received by the second user 7. In a simplified example, the second payment quantity (B2) may be the number of episodes requested (i) multiplied by the price of each episode (p).

The first node 15 then signs 130, with the first private key ($V_1$), the payment transaction ($E_i$) 27. The payment transaction ($E_i$) 27 is then sent to the second node 17. Since the payment transaction ($E_i$) has only been signed with the first private key ($V_1$), this is not yet a valid transaction as it requires the second node 17 to sign with the second private key ($V_2$).

Turning now to the second node 17 associated with the second user 7, the second node has a second processing device 23' that may include a mainframe computer, desktop computer, etc. The second processing device of the second node 17 receives 210, over the communications network 8, the request from the first node 15 to provide the episode of digital content and the payment transaction ($E_i$) signed with the first private key ($V_1$).

Before the second node 17 makes the episode of digital content available to the first node 15 and first user 5, the second node 17 needs to determine that the second user 17 will be able to receive payment. Accordingly, the second node 17 then verifies 220 the payment transaction ($E_i$) 27, which includes verifying that the payment transaction ($E_i$) 27 includes the payment quantity of cryptocurrency (B2) to the second user 7. In practical examples, this may include determining the correct amount of cryptocurrency as well as the correct destination.

Based on verifying the payment transaction ($E_i$) (i.e. in particular that the second user 7 will be paid) the second node 17 then provides access 230, over the communications network 8, the episode of digital content to be available to the first node 15. In turn, this allows the first node to access 140 the episode of digital content.

To give effect to the payment transaction ($E_i$) 27, the second node 17 then co-signs 240, with the second private key ($V_2$) of the second user 5, the payment transaction ($E_i$) 27 and sends the co-signed payment transaction to the blockchain 9. Thus the payment quantity of cryptocurrency (B2) will be transferred from the common address (23) that had the deposit quantity of cryptocurrency (B1).

In some examples, the first user 5 may have the opportunity to request and receive further episodes. Thus the second user 17 may have the opportunity to receive more payment (from the further episodes provided to the first user 5) and may therefore defer the step of co-signing 240 and sending the co-signed payment transaction to the blockchain 9 until a time closer to the specified time to refund the deposit of the second transaction 25. An example of distributing the next episode will now be described.

The first node 15 makes a request for the next episode of digital content from the series of digital content by repeating steps 110, 120, and 130 as described above but for the next episode. Importantly, the payment quantity of cryptocurrency will be adjusted to take into account the next episode (and previous episodes in the series where payment has not been made). The second node 17 similarly receives the request and distributes the next episode of digital content by repeating steps 210 to 230 as described above.

Thus the second node 17 has two payment transactions: a first payment transaction ($E_i$) 27 that includes payment quantity of cryptocurrency up to the episode of digital content, and a second payment transaction ($E_{i+1}$) 27' that includes a payment quantity of cryptocurrency up to and including the next episode of digital content. Since the second user 7 will be interested in receiving the maximum amount of payment, the second node 17 should only sign 240 and send the co-signed payment transaction 27' than includes the payment inclusive of that of the next episode— i.e. the second payment transaction ($E_{i+1}$) 27'. Therefore the first payment transaction ($E_i$) 27 may be abandoned by the second node 17.

The present disclosure may provide a system of communicating, transmitting and/or distributing digital content where the level of trust may be lower. For example, the level of exposure of either the first user 5 and/or second user 7 from deceitful conduct can be minimised. In one example, if the second user 7 fails to meet their obligation, the exposure (e.g. potential loss) to the first user would be the price of one episode of digital content (since the remaining amounts will be refunded).

The present disclosure may also provide a system that does not rely on other third parties, such as certificate authorities and hierarchies that may have single points of failure and vulnerable to attack. The use of cryptographic techniques enhances the security of the transmission/control arrangement provided by the invention.

A detailed example will now be described for the purposes of illustration.

Initialisation—Encryption Protocol

The first node 5 and second node 7 establish secure communication 101, 201, over the communications network 8, with one another. This may include encrypting communications with a shared symmetric encryption key (S). In some examples, the symmetric encryption key is based on a shared common secret. A technique for determining this common secret may be as follows:

determining a first node second private key based on at least a first node master private key and a generator value;

determining a second node second private key based on at least a second node master private key and the generator value;

wherein:

determining the common secret (CS) at the first node is based on the first node second private key and the second node second public key, and determining the common secret (CS) at the second node is based on the second node second private key and the first node second public key. The first node second public key and the second node second public key are respectively based on at least the first/second node master key and the generator value.

A method for deriving a key based on a shared common secret is described in more detail later in this description.

Deposit of Cryptocurrency to Common Address

To make the deposit in the first transaction 21 to the common address, the first node needs to determine the common address. In a pay to script hash (P2SH) system, this may be based on the public keys (corresponding the private keys used for signing). In one example, this includes determining the first public key ($P_1$) corresponding the first private key ($V_1$) of the first user 5, which should be known to the first node 5. This also includes determining the second public key ($P_2$) of the second user 5, which may be determined by receiving the second public key ($P_2$) from the second node 17, a third party, or from a data store. The second public key ($P_2$) does not necessarily need to be transmitted in a secure manner, although in some examples the second public key ($P_2$) may be encrypted with the shared symmetric encryption key (S).

The deposit quantity of cryptocurrency (B1) may be a quantity mutually agreed upon by the first and second user 5, 7. However, the deposit quantity of cryptocurrency (B1) may desirably be equivalent to the cost of the maximum amount of episodes of digital content in the series of digital content that can be received. This ensures that if the first user 5 decides to receive and watch all episodes, the deposit is sufficient to pay for all the episodes. Therefore if the series has a number of episodes n, and the price per episode is p, then the deposit quantity of cryptocurrency (B1) is n×p.

An example of the first transaction ($A_1$) 21 to transfer the deposit quantity of cryptocurrency (B1) is shown below in Table 1 and 2.

TABLE 1

First transaction ($A_1$)

| | | | |
|---|---|---|---|
| Transaction identifier | | | A1 |
| Version number | | | |
| Number of inputs | | | 1 |
| Input (unlocking) | Previous transaction | Hash | $A_\varnothing$ |
| | | Output index | |
| | Length of signature script | | |
| | Signature script | | <Alice's signature> <Alice's public key> |
| | Sequence number | | |
| Number of outputs | | | 1 |
| Output (locking) | Value | | np |
| | Length of public key script | | |
| | Public key script | | OP_HASH16Ø <hash16Ø (redeem script)> OP_EQUAL |
| Locktime | | | 0 |

TABLE 2

Redeem script for transaction ($A_1$)

| | |
|---|---|
| Redeem script | OP_2 <Alice's public key> <Bob's public key> OP_2 OP_CHECKMULTISIG |

In this example the first transaction ($A_1$) 21 has an input from a previous blockchain transaction of the first user ("Alice") 5 (that requires the first user's signature) an outputs to the common address (23). In this example, the output is to a hash that is based on a redeem script including the first user's public key ($P_1$, "Alice's public key") and the second user's public key ($P_2$, "Bob's public key"). That is, redeeming the output of the first blockchain transaction ($A_1$) 21 will require the signatures of both the first user 5, with the first private key ($V_1$), and the second user 7, with the second private key ($V_2$).

Figure 4:
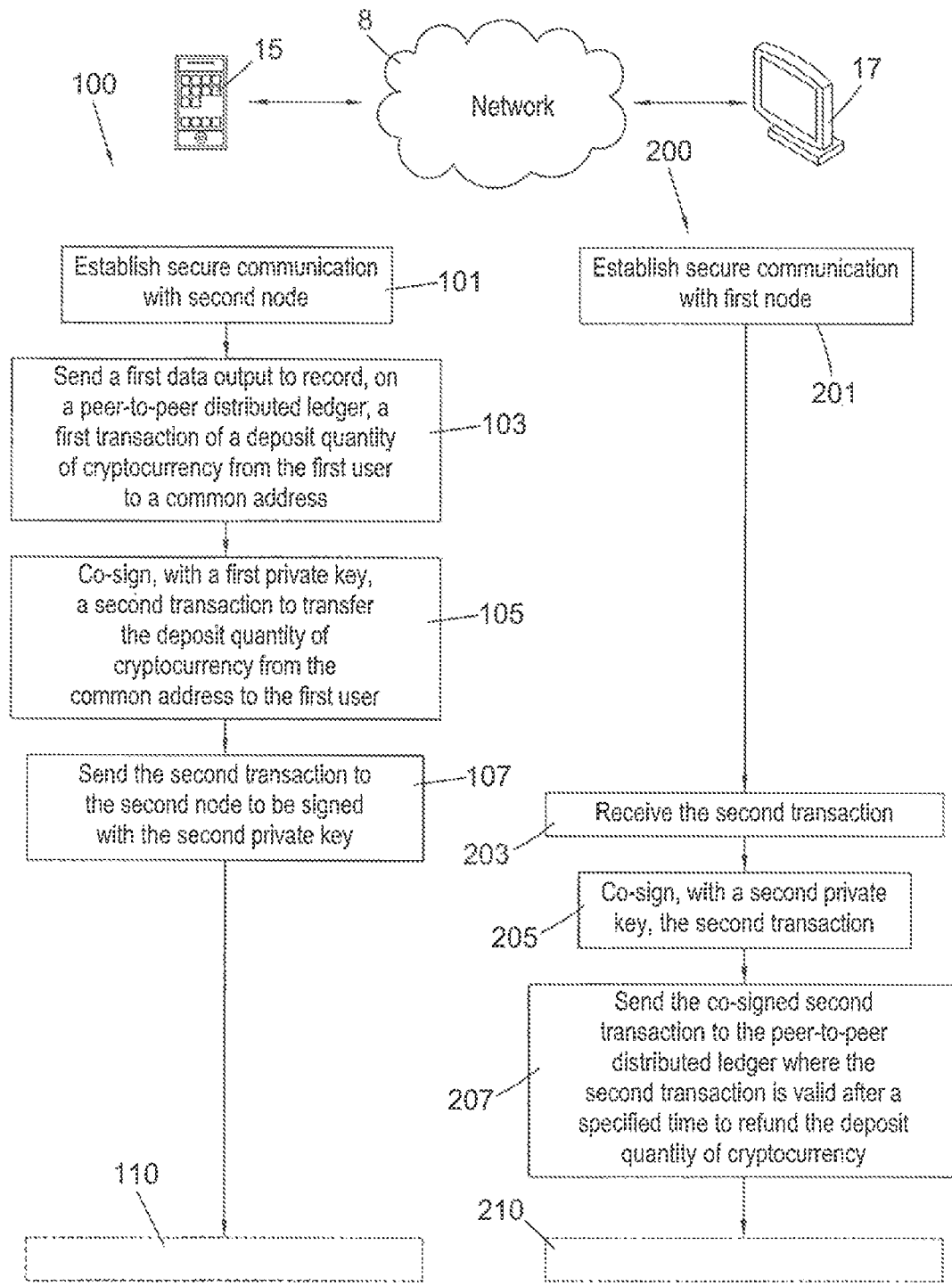
FIG. 4 is a flow chart of a computer-implemented method of initialising and creating a refund transaction.

Recording the above mentioned first transaction ($A_1$) 21, is shown in the method 100 performed by the first node 5 as shown in FIG. 4 where the first node where the first node 15 sends 103, over the communications network 8, a first data output (O1) to record, on the blockchain 9, a first transaction of the deposit quantity of cryptocurrency from the first user 5 to the common address (23).

Creating a Refund Transaction

A second blockchain transaction 25 is then created so that the deposit quantity of cryptocurrency (B1) is refunded after an expiry of a specified time.

This may include the first node 15 creating the second transaction 25 that includes spending the deposit quantity of cryptocurrency (B1) back to the first user 5, but only after a specified time in the future. The specified time may include setting a lock time to the second transaction of d days in the future expressed in Unix time.

An example of the second transaction (21) 25 to refund the deposit quantity of cryptocurrency (B1) is shown below in Table 3.

TABLE 3

Second transaction ($A_2$)

| | | | |
|---|---|---|---|
| Transaction identifier | | | $A_2$ |
| Version number | | | |
| Number of inputs | | | 1 |
| Input (unlocking) | Previous transaction | Hash | $A_1$ |
| | | Output index | 0 |
| | Length of signature script | | |
| | Signature script | | OP_Ø <Alice's signature> <Bob's signature> <redeem script> |
| | Sequence number | | |
| Number of outputs | | | 1 |
| Output (locking) | Value | | np |
| | Length of public key script | | |
| | Public key script | | OP_DUP OP_HASH16Ø <hash16Ø(Alice's public key)> OP_EQUALVERIFY OP_CHECKSIG |
| Locktime | | | d days in the future expressed in Unix time (the number of seconds that have elapsed since 00:00:00 UTC 1 Jan. 1970) |

In this example the second transaction ($A_2$) 25 has an input from the first transaction ($A_1$) 21. Unlocking the input from the common address (23) 23 requires both the first user's signature with the first private key ($V_1$) and the second user's signature with the second private key ($V_2$). In this example, the output refunds the deposit quantity of cryptocurrency (which in this case is np) back to the first user 5, and therefore the output is based on a hash of the first user's public key ($P_1$, "Alice's public key") only. That is, redeeming the output of the first transaction ($A_1$) 21 will only require the signature of the first user 5, with the first private key ($V_1$) as the first user 5 should be free to spend their own refunded cryptocurrency.

Importantly, the second transaction ($A_2$) 25 is only valid after a specified time, which in this case is achieved by the locktime function where the transaction is only valid after the specified time. For examples, d days (expressed in Unix time).

Recording the second transaction ($A_2$) 25 is shown in FIG. 4 as steps 105, 107 performed by the first node 15 and steps 203, 205, 207 performed by the second node 17. The first node 15 co-signs 105, with the first private key ($V_1$) of the first user 5, the second transaction. This second transaction ($A_2$) 25 is then sent 107, over the communications network 8, to the second node 17 to be signed with second private key ($V_2$). In turn, the second node 17 receives 203 the second transaction ($A_2$) 25, and the second node 17 further co-signs 205 the second transaction ($A_2$) 25 with the second private key ($V_2$) of the second user 7. The second transaction ($A_2$) 25, now signed with both private keys is then sent 207, over the communications network 8, to the blockchain 9 where it will be valid after the specified time to refund the deposit quantity of cryptocurrency (B1) if no other valid transactions (such as a payment transaction 27) are sent before that specified time.

It is to be appreciated that these steps may be performed in other orders. For example, the second node 17 may sign the second transaction first, and send it to the first node 15 to sign second. It is to be appreciated that either nodes can create the second transaction (before signing) and either node can send the co-signed transaction to the blockchain 9. In other examples, the first and second nodes 15, 17 may send the transaction to other intermediate nodes that in turn send it to other nodes and/or the blockchain 9.

Requesting Digital Content and Determining a Payment Transaction

Figure 5:
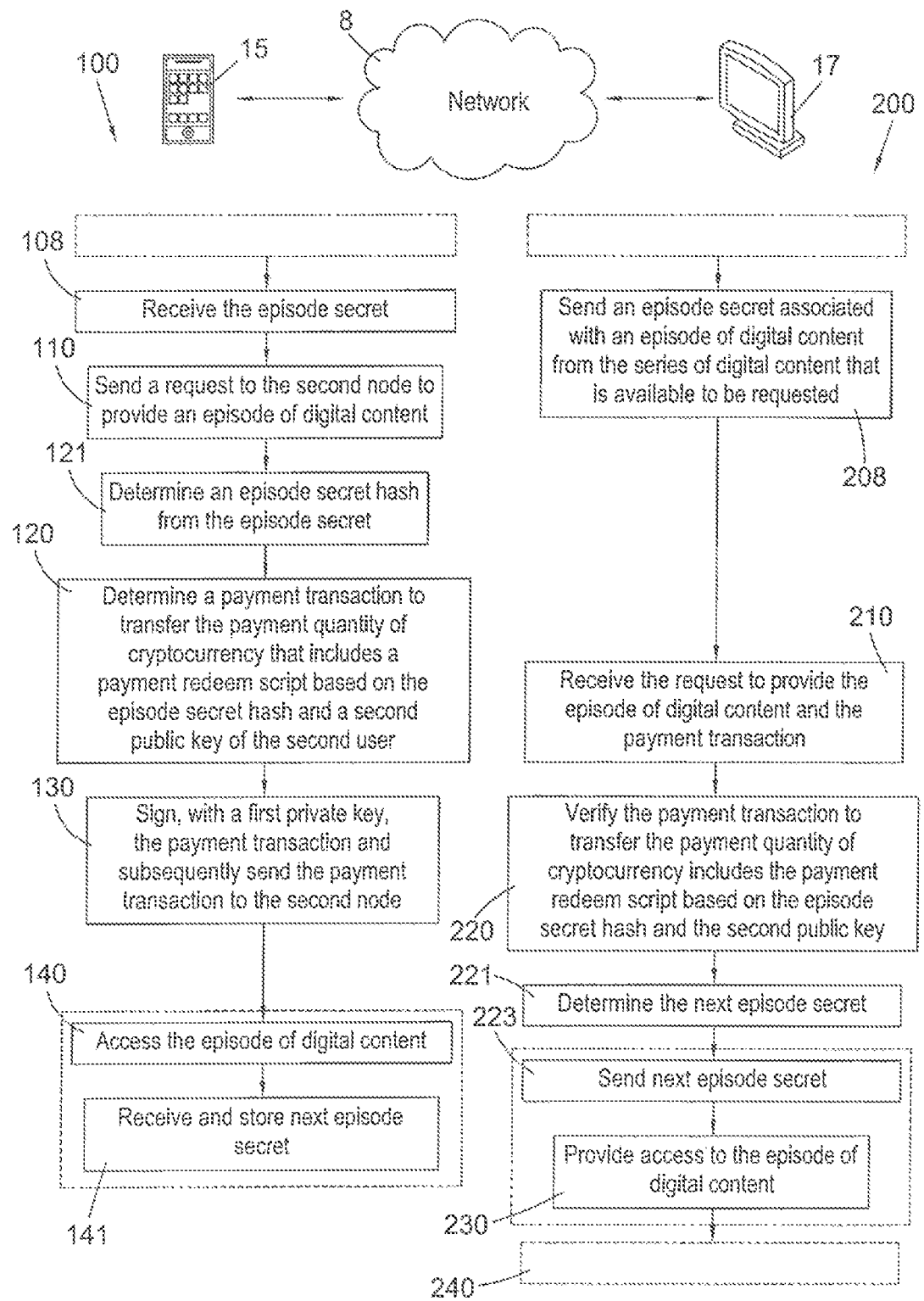
FIG. 5 is a detailed flow chart of a computer-implemented method for distributing and receiving digital content according to one example.

The method of requesting digital content and creating a payment transaction will now be described with reference to FIG. 5.

The second node 17 determines, for each episode (i) of digital content, a corresponding episode secret ($S_i$). The episode secret ($S_i$) can be used to identify the episode (i) for those who know the secret, in particular the first user 5 and the second user 7. This can be useful to maintain privacy where information is sent to the blockchain 9.

The second node 17 sends 208 an episode secret ($S_i$) for a first episode of digital content in the series of digital content to the first node 17. In this example, only the episode secret of the following episode that is available to the first user 5 and first node 15 is sent. The subsequent episode secrets are withheld until the first node 15 accesses the first episode. This ensures that the episodes are accessed in order.

When sending 208 the episode secret ($S_i$), the second node 17 may create and send an encrypted message by encrypting the episode secret ($S_i$) with the shared symmetric encryption key (S) to maintain secrecy of the episode secret ($S_i$). The first node 15 then receives 108 the encrypted message, including the episode secret ($S_i$), from the second node 17. The first node 15 then decrypts the encrypted message with the shared symmetric encryption key (S) to obtain the episode secret ($S_i$).

The first node 15 may store the episode secret ($S_i$) in a data store until the first user 5 decides to access the first episode of digital content. Assuming that the specified time has not expired (i.e. it is before d day), the method 100 at the first node 15 includes sending 110, over a communications network 8, a request to the second node 17 to provide the first episode of digital content. This request is accompanied by a payment transaction 27 for the first episode determined 120 at the first node which will be described below.

Determining the Payment Transaction

The payment transaction ($E_i$) 27, if valid, will spend from the common address (23) (and in particular the deposit quantity of cryptocurrency (B1) therefrom) and accordingly requires the signature of both the first user 5 and second user 7. Therefore after determining the payment transaction ($E_i$) 27, the first node 15 will need to sign the payment transaction ($E_i$) 27 and send it to the second node 17 for co-signing before sending to the blockchain 9.

The first node 15 first determines 121 an episode secret hash ($H_i$) from the episode secret ($S_i$). This may include using a hash function such as OP_HASH 160 (where the input is hashed twice—with SHA-256 and subsequently with RIPEMD-160). It is to be appreciated that other hash functions may also be suitable.

The payment transaction ($E_i$) 27, in this example, is in the form of a P2SH. Therefore determining the payment transaction ($E_i$) 27 also includes determining a redeem script, which in this case is a payment redeem script (RS1) that is based on: the episode secret hash ($H_i$); and the second public key ($P_2$) of the second user 7. Including the episode secret hash ($H_i$) in the redeem script may be used as proof that this particular payment transaction is related to access of the particular episode (associated with the episode secret hash ($H_i$) and the episode secret ($S_i$)). Secondly, the second public key ($P_2$) of the second user 7 ensures that only the second user 7, having the corresponding second private key ($V_1$), can spend that payment.

Determining 120 the payment transaction ($E_i$) 27 also includes determining the payment quantity of cryptocurrency (B2) to the second user 7. In the case of the first episode, this payment quantity will be the price of that first episode. However as the first user 5 makes further requests for subsequent episodes, the payment quantity of cryptocurrency (B2) will change based on episodes that have been requested. In a simplified example, this may be the quantity of episodes multiplied by the price per episode.

In addition to an output to the second user 7, the payment transaction ($E_i$) 27 may include another output back to the first user 5. This output back to the first user 5 may be representative of the change of the deposit quantity of cryptocurrency (B1) back to the first user. In one example, the change quantity of cryptocurrency (B3) to the first user 5 may be based on the deposit quantity of cryptocurrency (B1) less the payment quantity of cryptocurrency (B2).

The method 100 then includes signing 130, with the first private key ($V_1$), the payment transaction ($E_i$) 27 and subsequently sending the payment transaction ($E_i$) 27 to the second node 17 to cause the second node 17 to verify the payment transaction.

An example of the payment transaction ($E_i$) is shown below in Table 4 and 5.

TABLE 4

| Payment transaction ($E_i$) | | | |
|---|---|---|---|
| Transaction identifier | | | $E_i$ |
| Version number | | | |
| Number of inputs | | | 1 |
| Input (unlocking) | Previous trans. | Hash Output index | $A_1$ Ø |
| | Length of signature script | | |
| | Signature script | | \<Alice's signature\> \<Bob's signature\> \<redeem script\> |
| | Sequence number | | |
| Number of outputs | | | 2 |
| Output 1 (locking) | Value | | ip |
| | Length of public key script | | |
| | Public key script | | OP_HASH16Ø \<hash16Ø (redeem script)\> OP_EQUAL |
| Output 2 (locking) | Value | | (n − i)p |
| | Length of public key script | | |
| | Public key script | | OP_DUP OP_HASH16Ø \<hash16Ø (Alice's public key)\> OP_EQUALVERIFY OP_CHECKSIG |
| Locktime | | | Ø |

TABLE 5

| Output 1 redeem script of payment transaction ($E_i$) | |
|---|---|
| Redeem script | OP_HASH16Ø \<$h_i$\> OP_EQUALVERIFY \<Bob's public key\> OP_CHECKSIG |

The input to this transaction includes an unlocking script that requires the both the signatures of the first private key ($V_1$) of the first user 5 ("Alice's signature") and the second private key ($V_2$) of the second user 7 ("Bob's signature") as the payment transaction is spending from the common address (23).

"Output 1" shows the output of the payment quantity of cryptocurrency (B2) to the second user 7. This output can be redeemed by payment redeem script (RS1) shown in Table 5 which is based on the episode secret hash ($H_i$) and the second user public key ($P_2$) ("Bob's public key") as described above.

"Output 2" shows the output that is the change quantity of cryptocurrency (B3) back to the second user 7. Note that the output script is based on the first user's public key $P_1$ (Alice's public key) as the first user should be free to spend this change quantity of cryptocurrency (B3).

Verifying the Payment Transaction

The second node 17 receives 210, over the communications network 8, the request to provide the first episode of digital content. Accordingly the second node 17 will also expect to receive the payment transaction ($E_i$) 27, signed with the first private key ($V_1$), from the first node 15.

Before agreeing to the request to provide the episode of digital content, the second node will verify the payment transaction ($E_i$) so that the first user 7 can have confidence that they will receive payment.

The second node 17 determines 121 the episode secret hash ($H_i$) from the episode secret ($S_i$). This may include using a hash function in the same way as the first node 15. The second node then verifies 220 the payment transaction ($E_i$) that was received includes the payment quantity of cryptocurrency (B2) to the second user 7. This may include verifying the output value (such as output value in "Output 1" of Table 4) is the correct value by verifying the value is equal to the quantity of episodes request multiplied by the price.

Verifying 220 may also include verifying that the payment redeem script (RS1) is based on the episode secret hash (a) and the second public key ($P_2$). This may be achieved by comparing the output script (which is based on the redeem script) in the received payment transaction ($E_i$) with a corresponding hash of the known (or derivable) values of the episode secret hash ($H_i$) and the second public key ($P_2$). If this comparison shows that the output script matches the expected redeem script having the correct episode secret hash (a) and the second public key ($P_2$), then the second node 17 (and the second user 7) can have confidence of the bona fide of the received payment transaction ($E_i$).

Although the second node 17 may sign the payment transaction ($E_i$) 27 and immediately send it to the blockchain 9, the second user 7 is not motivated to do so until closer towards the specified time as the first user 5 may make further requests for more episodes of digital content.

After successful verification, the second node 17 then provides access to the requested episode to the first node 15 as well as the next episode secret to the first node to allow the first node to request further content (being the next episode).

Determine the Next Episode Secret

The second node 17 then determines 221 the next episode secret ($S_{i+1}$) for the next episode i+1 (which is the episode after episode (i) to be provided) in the series of digital content unless there are no more episodes in the series. This may include retrieving the next episode secret ($S_{i+1}$) from the data store 18, or generating a new secret. The next episode secret ($S_{i+1}$) is used to determine the next episode secret hash ($H_{i+1}$) which in turn is used in the next payment transaction if the first user 5 decides to make a request for the next episode in the future.

The next episode secret ($S_{i+1}$) may be provided to the first node 15 at the same time the second node provides access to the present requested episode of digital content.

Providing Access to Digital Content

Once the payment transaction ($E_i$) 27 has been verified, the second node 17 provides access 230 to the episode of digital content to the first node 15. This may be achieved in a number of ways. In one example, the second node 17 may encrypt the episode of digital content with the shared symmetric encryption key (S) and send the encrypted episode of digital content, over the communications network 8, to the first node 15. In another example, the second node may provide the encrypted episode of digital content at a data store 11 associated with a content server 3, whereby the first node 15 may receive the encrypted episode from the data store 11 at a suitable time for the first node 15. In yet another example, the second node 15 may provide an episode specific encryption key to decrypt the episode.

In one example, the episode (i) of digital content that was requested may be concatenated with the next episode secret ($S_{i+1}$). The concatenation may then be encrypted with the shared symmetric encryption key and the second node 17 then provides access to the encrypted concatenation.

The second node 17 may then send, over the communications network 8, a notification to the first node 15 indicating that the requested episode (i) of digital content is available to be accessed.

In turn, the first node 15 then accesses 140 the encrypted concatenation (e.g. by downloading from the data store 11 or directly from the second node 17, etc.) and decrypts it with the shared symmetric encryption key. This provides, at the first node 15, the episode of digital content (i) as well as the next episode secret ($S_{i+1}$). Importantly, this provides the first user the episode of digital content for consumption as well as a means (i.e. the next episode secret ($S_{i+1}$)) to obtain the next episode. The first node 15 may store 141 the next episode secret ($S_{i+1}$) for later use.

It is to be appreciated that in some alternatives, the next episode secret may be sent 223 from the second node 17 to the first node 15 at other times and not concatenated with the episodes of digital content. This may include sending the next episode secret ($S_{i+1}$) as a separate encrypted message over the communications network.

Requesting the Next Episode

If the first user 5 wishes to watch the next episode i+1, the first node 15 may then repeat the above steps of sending 110 a request for an episode of digital content, determining 120 a next payment transaction and signing 130 the next payment transaction. This can be done with the next episode secret ($S_{i+1}$) and a corresponding determined next episode secret hash ($H_{i+1}$). In turn, the second node 15 will repeat the steps of receiving 210 the request and next payment transaction, verifying 220 the next payment transaction and providing access 230 to the next episode.

The above can be repeated until all the episodes of digital content have been accessed by the first node 15 or when it is close to, or at, the expiry of the specified time d days. In these situations, the second node 15 will then perform the following steps to effect the payment to the second user 7.

Co-Signing the Payment Transaction

When all the episodes in the series of digital content have been accessed by the first node 15, the second user 7 will be motivated to co-sign the latest payment transaction ($E_i$) 27" to receive payment as there will be no further payment transactions 27". Alternatively, if the expiry period of the specified time is approaching, the second user 7 will be motivated to co-sign the latest payment transaction ($E_i$) 27" as it would be unlikely that the first user 5 will make any further requests. More importantly, the payment transaction ($E_i$) must be co-signed and sent to the blockchain 9 before the specified time to ensure it is recorded before the second transaction (refund transaction) is valid.

Thus the method 200 includes the second node 17 co-signing 240, with the second private key ($V_2$), the latest payment transaction ($E_i$) 27" and sending the co-signed payment transaction to the blockchain 9.

When the second user 7 wishes to spend the payment quantity of cryptocurrency (B2), the second node 17 will unlock the transaction by signing the redeem script shown in Table 5 by signing with the second user private key ($V_2$) and the episode secret ($S_i$) corresponding to the episode secret hash ($H_i$) in the payment transaction ($E_i$). This is shown in the unlocking script in Table 6 below. Please note that the redeem script, in the format as shown in Table 5, can be determined by the second node 17 based on the second user public key ($P_2$) and the episode secret ($S_i$), wherein the episode secret ($S_i$) is used to derive the episode secret hash ($H_i$).

TABLE 6

The second user spending the payment quantity of cryptocurrency

|  |  |  |
|---|---|---|
| Transaction identifier | | B |
| Version number | | |
| Number of inputs | | 1 |
| Input (unlocking) | Previous Hash | $E_i$ |
| | transaction Output index | Ø |
| | Length of signature script | |
| | Signature script | <Bob's signature> <$s_i$> <redeem script> |
| | Sequence number | |
| | Number of outputs | |
| Output (locking) | Value | ip |
| | Length of public key script | [Dependent on how Bob decides to spend] |
| | Public key script | [Dependent on how Bob decides to spend] |

Variations

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

In one example variation, each payment transaction ($E_i$) may itself have a respective payment specified time before it is valid. For example, the payment specified time may be a time (e.g. d−1 day) before the specified time (e.g. d days) of the second transaction (i.e. the refund transaction) so that the payment transaction ($E_i$) is the valid transaction before the second transaction.

Therefore in this variation, the second node 17, upon verifying the payment transaction may immediately co-sign and send the payment transaction (Tx) to the blockchain 9.

For subsequent payment transactions, these subsequent payment transactions have a respective specified time (e.g. d−2 days) that is earlier than the specified time of the preceding payment transaction (e.g. d−1 days). Thus the subsequent payment transactions, once co-signed and sent to the blockchain 9 will precede and be valid over the earlier payment transactions and the second (refund) transaction. An advantage of this variation is that if the second node 17 has a failure at a time close to the specified time for the second (refund) transaction, the second user 7 will still receive payment as the payment transactions have already been co-signed and sent to the blockchain 9.

Shared Symmetric Key Based on a Shared Common Secret

A method of generating a common secret between two nodes is now described. The common secret can be used in the generation of a cryptographic key.

Determining a Common Secret

The method allows for the generation of a common secret between two nodes without requiring the common secret to be sent to and/or from either one of the nodes. Each node has a respective asymmetric cryptography pair (such as an elliptic curve cryptography pair), each pair including a master private key and a master public key. For example the first node may have a master private key ($V_{1P}$) and a master public key ($P_{1P}$), and the second node may have a master private key ($V_{1E}$) and a master public key ($P_{1E}$). Respective second private and public keys of each node may be determined based on the master private key, master public key and a generator value. The generator value (or a message used to derive the generator value) is communicated to and/or from the nodes.

A common secret may be determined at each of the nodes based on the second private and public keys. An example of determining a common secret between a first node and a second node will now be described. Both the first and second nodes determine a generator value that is common to both nodes. The generator value may be received by a message, or derived from a message.

At the first node, the common secret (CS) is based on:
(i) a first node second private key ($V_{2P}$) based on the first node master private key ($V_{1P}$) and the generator value (GV); and
(ii) a second node second public key ($P_{2E}$) based on the second node master public key ($P_{1E}$) and the generator value (GV).

At the second node, the same common secret (CS) can be determined based on:
(iii) a first node second public key (Pap) based on the first node master public key ($P_{1P}$) and the generator value (GV); and
(iv) a second node second private key ($V_{2E}$) based on the second node master private key ($V_{1E}$) and the generator value (GV).

Thus the common secret is:

Common secret (CS)=($V_{2P} \times P_{2E}$)=($P_{2P} \times V_{2E}$)

Securely Transmitting Information

The common secret may be used to encrypt information for secure transmission. For example, a symmetric key may be based on the common secret. Since both nodes have the same common secret, they can determine the same symmetric key which can be used for encrypting and decrypting information transmitted (for example over an unsecure network) between the two nodes.

Processing Device

As noted above, the first user 5 and second user 7 are associated with respective first node 15 and second node 17. The first node 15 and second node 17 may be an electronic device, such as a computer, tablet computer, mobile communication device, computer server, computer terminal, etc. Such an electronic device may include a processing device, and accordingly, the first node 15 has a first processing device 23 and the second node 17 has a second processing device 23". The electronic device may also be associated with a data store 11, 18 and a user interface. Examples of a user interface include a keyboard, mouse, monitor, touchscreen display, etc. The blockchain 9 may also be associated with multiple processing devices 19.

Figure 6:
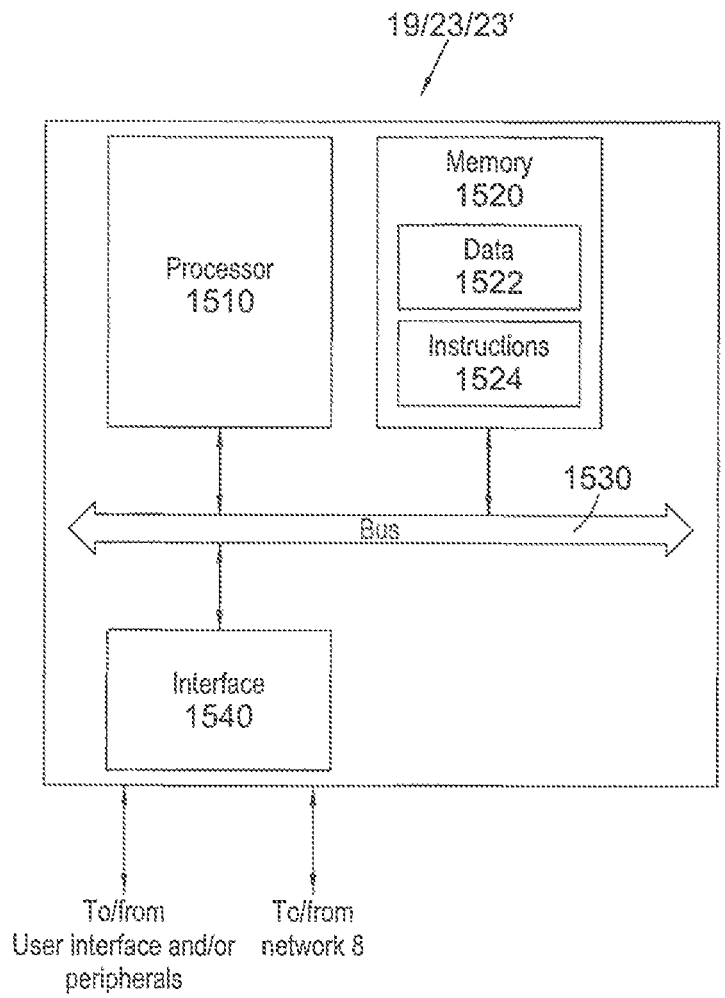
FIG. 6 illustrates a schematic example of a processing device.

FIG. 6 illustrates an example of a processing device 19, 23. The processing device 19, 23 includes a processor 1510, a memory 1520 and an interface device 1540 that communicate with each other via a bus 1530. The memory 1520 stores instructions and data for implementing the method 100, 200 described above, and the processor 1510 performs the instructions (such as a computer program) from the memory 1520 to implement the methods 100, 200. The interface device 1540 may include a communications module that facilitates communication with the communications network 8 and, in some examples, with the user interface and peripherals such as data store 11, 18. It should be noted that although the processing device 1510 may be independent network elements, the processing device 1510 may also be part of another network element. Further, some functions performed by the processing device 19, 23 may be distributed between multiple network elements. For example, the first user 5 may be associated with multiple processing devices 23 (such as those of the first user's mobile communication device, tablet, desktop computer, home media player, television, etc.) and steps of the method 100 may be performed, and distributed, across more than one of these devices.

The invention claimed is:

1. A computer-implemented method of receiving and distributing digital content between two nodes of a blockchain network using a cryptocurrency transaction, the method comprising:

determining, by a first blockchain node (15), a common address by:

determining a first public key ($P_1$) corresponding to a first private key ($V_1$) of a first user (5), the first user (5) known to the first blockchain node (5), wherein the first user (5) is associated with a deposit quantity of cryptocurrency (B1) at the common address (23), and wherein to spend from the common address requires signatures of both the first private key ($V_1$) of the first user (5) and a second private key ($V_2$) of a second user (7); and determining a second public key ($P_2$) of the second user (5) by receiving the second public key ($P_2$) from a second blockchain node (17), a third party, or from a data store, wherein the second public key ($P_2$) is encrypted with a shared symmetric encryption key(S); and the method further comprising:

(A) sending, over a communications network (8), a request to the second blockchain node (17) to provide an episode of digital content (i) from a series of digital content;

(B) determining a payment transaction ($E_i$) to transfer from the common address (23) a payment quantity of cryptocurrency (B2) to the second user (7), wherein the payment quantity of cryptocurrency (B2) is based on a quantity of episodes of digital content in the series of digital content requested by the first user (5);

(C) signing, with the first private key ($V_1$), the payment transaction ($E_i$) and subsequently sending the payment transaction ($E_i$) to the second blockchain node (17) to cause the second blockchain node (17) to verify the payment transaction;

(D) based on the second blockchain node (17) having verified the payment transaction ($E_i$), includes the payment quantity of cryptocurrency (B2), and determining that a time is close to a specified time to refund a deposit of a second transaction (25), co-signing and sending the payment transaction (Tx) to a blockchain (9);

(E) receiving, by the first blockchain node (15) associated with the first user (5), the digital content by accessing, over the communications network (8), an encrypted concatenation comprising the requested episode and a next episode-specific key ($S_{i+1}$) in return for providing the payment quantity to the second user (7) associated with the second blockchain node (17);

(F) decrypting, by the first blockchain node (15) associated with the first user (5) the encrypted concatenation using the shared symmetric encryption key(S) to reveal the requested episode and the next episode-specific key ($S_{i+1}$);

(G) hashing, by the first blockchain node (15), the next episode-specific key ($S_{i+1}$) to determine a next episode-specific hash ($H_{i+1}$);

(H) sending, over the communications network (8), a next request to provide the next episode of the digital content (i);

(I) determining a next payment transaction ($E_{i+1}$) to transfer from the common address (23) a next payment quantity of cryptocurrency (B2) to the second user (7), the next payment transaction having a respective specified time that is earlier than the specified time of a preceding payment transaction and the next payment transaction ($E_{i+1}$) includes a next payment redeem script (RS2) based on the next episode-specific hash ($H_{i+1}$);

(J) signing, with the first private key (V1), the next payment transaction ($E_{i+1}$) and subsequently sending the next payment transaction ($E_{i+1}$) to the second blockchain node (17) to cause the second blockchain node (17) to verify the next payment transaction ($E_{i+1}$); and (K) based on the second blockchain node (17) having verified that the next payment transaction ($E_{i+1}$) includes the subsequent payment quantity of cryptocurrency and the next payment redeem script (RS2), co-signing, and sending the next payment transaction ($E_{i+1}$) to the blockchain (9).

2. The computer-implemented method of claim 1, further comprising sending, by the second blockchain node (17), the payment transaction ($E_i$) to other intermediate nodes that in turn send it to other nodes and/or the blockchain (9).

3. The computer-implemented method of claim 1, further comprising refunding, after the specified time without a transaction of the deposit quantity of cryptocurrency from the common address (23), the deposit quantity of cryptocurrency (B1), by:

causing a first processing device to co-sign, with a first private key ($V_1$) of the first user (5), a second transaction to transfer the deposit quantity of cryptocurrency (B1) from the common address (23) to the first user (5); and causing a second processing device to co-sign, with the second private key ($V_2$), the second transaction, wherein the co-signed second transaction with both the first private key ($V_1$) and the second private key ($V_2$) is sent to the blockchain (9) and is valid after the specified time to refund the deposit quantity of cryptocurrency (B1); and sending the co-signed transaction to the blockchain (9) before the specified time.

4. The computer-implemented method of claim 1, in step (E), providing by the second blockchain node (17) the access to the digital content by sending digital content from a first data store (18) to the first blockchain node (15).

5. The computer-implemented method of claim 1, further comprising in step (E), providing by the second blockchain node (17) access to the digital content by making digital content at a second data store (11) associated with a content server (3) available, via the communication network (8), to the first blockchain node (15).

6. The computer-implemented method of claim 4, further comprising receiving at the first blockchain node (15) an encrypted episode from the data store (11) at a time defined by the first blockchain node (15).

7. The computer-implemented method of claim 1, further comprising determining that the second user (7) has failed to meet their obligation, and exposing the first user to a price of one episode of digital content as a result.

8. The computer-implemented method of claim 1, determining that the deposit quantity of cryptocurrency is equivalent to a cost of the maximum amount of episodes of digital content in the series of digital content that can be received.

9. The computer-implemented method of claim 1, further comprising:
determining at each of the nodes a common secret to encrypt information for secure transmission based on second private keys and second public keys, at the first blockchain node, the common secret (CS) is based on:
(i) a first blockchain node second private key ($V_{2P}$) based on a first blockchain node master private key ($V_{1P}$) and a generator value (GV); and
(ii) a second blockchain node second public key ($P_{2E}$) based on a second blockchain node master public key ($P_{1E}$) and the generator value (GV), and
at the second blockchain node, the same common secret (CS) can be determined based on:
(iii) a first blockchain node second public key ($P_{2P}$) based on a first blockchain node master public key ($P_{1P}$) and the generator value (GV); and
(iv) a second blockchain node second private key ($V_{2E}$) based on a second blockchain node master private key ($V_{1E}$) and the generator value (GV).

10. The computer-implemented method of claim 9, further comprising encrypting and decrypting information between the first blockchain node and the second blockchain node using a symmetric key based on the common secret.

* * * * *